US012428223B2

(12) United States Patent
Fraas et al.

(10) Patent No.: US 12,428,223 B2
(45) Date of Patent: Sep. 30, 2025

(54) REFUSE PACKER SYSTEM WITH AUGER

(71) Applicant: The Heil Co., Chattanooga, TN (US)

(72) Inventors: Mark Fraas, Centre, AL (US); Eric Evans, Fort Payne, AL (US); Michael Shane Peek, Pisgah, AL (US); Tracy Mason, Mentone, AL (US); Tapankumar Pandya, Doltewah, TN (US); Bryan White, Fort Payne, AL (US); Taher Taiyeb Basrai, Chattanooga, TN (US)

(73) Assignee: The Heil Co., Chattanooga, TN (US)

( * ) Notice: Subject to any disclaimer, the term of this patent is extended or adjusted under 35 U.S.C. 154(b) by 124 days.

(21) Appl. No.: 17/810,995

(22) Filed: Jul. 6, 2022

(65) Prior Publication Data

US 2023/0008771 A1 Jan. 12, 2023

Related U.S. Application Data

(60) Provisional application No. 63/218,789, filed on Jul. 6, 2021.

(51) Int. Cl.
*B65F 3/22* (2006.01)
*B65F 3/28* (2006.01)
*B65F 3/14* (2006.01)

(52) U.S. Cl.
CPC .................. *B65F 3/22* (2013.01); *B65F 3/28* (2013.01); *B65F 2003/146* (2013.01)

(58) Field of Classification Search
CPC ..................................... B65F 3/22; B65F 3/28
See application file for complete search history.

(56) References Cited

U.S. PATENT DOCUMENTS 2,039,325 A * 5/1936 Lippert ..................... F23K 3/04 110/105.6
2,488,966 A 11/1949 Dear
(Continued)

FOREIGN PATENT DOCUMENTS

CN 206050663 3/2017
DE 2458903 6/1976
(Continued)

OTHER PUBLICATIONS

International Preliminary Report on Patentability in International Appln. No. PCT/CA2018/050149, dated Aug. 20, 2020, 7 pages.
(Continued)

*Primary Examiner* — James Keenan
(74) *Attorney, Agent, or Firm* — Fish & Richardson P.C.

(57) ABSTRACT

A refuse collection vehicle having a packer system, a hopper, and a storage compartment. A wall between the storage compartment and the hopper defines an opening that allows refuse to pass from the hopper to the storage compartment. The packer system includes an auger screw and a driver. The driver rotates the auger screw such that refuse is packed into the storage compartment through the opening. A door can be positioned to cover the opening in the wall to inhibit refuse from passing back through the opening. A door actuator system moves the door to selectively open and close the door on the opening. A packing actuator can push an ejector panel across the floor of the storage compartment while the door is closed on the opening in the wall to further compact refuse in the storage compartment or to eject refuse from the vehicle.

24 Claims, 17 Drawing Sheets

(56) References Cited

U.S. PATENT DOCUMENTS

| | | | | | |
|---|---|---|---|---|---|
| 2,922,535 | A * | 1/1960 | Balbi | B65F 3/201 414/679 |
| 3,490,631 | A * | 1/1970 | Smith | B65F 3/143 414/525.6 |
| 3,508,673 | A * | 4/1970 | Pappas | B65F 3/201 100/220 |
| 3,643,824 | A * | 2/1972 | Partridge | B65F 3/26 100/232 |
| 3,864,260 | A | 2/1975 | Banner | |
| 3,872,984 | A * | 3/1975 | Moser | B65F 3/28 414/525.2 |
| 4,221,527 | A | 9/1980 | Morrison | |
| 4,227,849 | A * | 10/1980 | Worthington | B65F 3/22 414/547 |
| 4,260,317 | A | 4/1981 | Martin et al. | |
| 4,309,141 | A | 1/1982 | Van Drie | |
| 4,640,659 | A | 2/1987 | Parks | |
| 4,948,323 | A | 8/1990 | Gasparini | |
| 5,421,689 | A * | 6/1995 | Boivin | B65F 3/26 414/517 |
| 5,857,822 | A | 1/1999 | Christenson | |
| 6,827,542 | B1 | 12/2004 | Stragier | |
| 7,563,066 | B2 | 7/2009 | Jones et al. | |
| 10,427,871 | B2 | 10/2019 | Fillion et al. | |
| 11,091,319 | B2 * | 8/2021 | Lapointe | B65F 3/22 |
| 11,319,147 | B2 | 5/2022 | Maroney et al. | |
| 11,407,586 | B2 | 8/2022 | Boivin et al. | |
| 11,667,469 | B2 * | 6/2023 | Betz | B65F 3/201 414/525.2 |
| 2003/0215315 | A1 | 11/2003 | Jones et al. | |
| 2020/0034785 | A1 | 1/2020 | Romano et al. | |
| 2020/0128736 | A1 | 4/2020 | Banks, Jr. et al. | |
| 2020/0247609 | A1 | 8/2020 | Maroney et al. | |
| 2020/0346861 | A1 | 11/2020 | Rocholl et al. | |
| 2020/0346862 | A1 | 11/2020 | Rocholl et al. | |
| 2021/0039880 | A1 | 2/2021 | Boivin et al. | |
| 2023/0016127 | A1 | 1/2023 | Boivin et al. | |

FOREIGN PATENT DOCUMENTS

| | | | | |
|---|---|---|---|---|
| EP | 0285467 | A1 * | 10/1988 | B65F 3/201 |
| EP | 2058246 | | 5/2009 | |
| EP | 2374737 | A1 * | 10/2011 | B65F 3/22 |
| GB | 2333489 | A * | 7/1999 | B65F 3/22 |
| JP | S60152874 | A * | 8/1985 | |
| WO | WO 2019/153066 | | 8/2019 | |

OTHER PUBLICATIONS

International Search Report and Written Opinion in International Appln. No. PCT/CA2018/050149, dated Oct. 29, 2018, 8 pages.

Office Action in Canadian Appln. No. 3,164,083, mailed on Dec. 18, 2023, 6 pages.

[No Author Listed] [online], "100% electric automated collection truck," Boivin Evolution, Aug. 27, 2019, retrieved on Jul. 9, 2024, <https://www.youtube.com/watch?v=WRhw8Hj8rrk>, 47 pages [Video Submission].

* cited by examiner

REFUSE PACKER SYSTEM WITH AUGER

CROSS REFERENCE TO RELATED APPLICATION

This application claims the benefit under 35 U.S.C. § 119(e) of U.S. Patent Application No. 63/218,789, entitled "Refuse Packer System with Auger," filed Jul. 6, 2021, which is incorporated herein by reference in its entirety.

BACKGROUND

Refuse collection vehicles ("RCVs") often include packing mechanisms for compacting and ejecting refuse material. The forces required to effectively pack the large quantities of refuse are substantial. To meet the demands of this application, ejector panels used to pack the material are often driven using telescopic hydraulic cylinders. Although hydraulic cylinders are well-suited to supply the forces needed to achieve packing, the use of hydraulic cylinders in a refuse application comes with high maintenance costs. The potential for contamination of the hydraulic fluid, for example, results in frequent maintenance intervals, vehicle down-time, and sometimes costly repairs.

Some refuse vehicles use an auger mechanism to compact refuse. In some auger systems, refuse that has been dropped into a hopper is advanced by a rotating auger screw to push and compact refuse into a compartment at the rear of the vehicle. This compacted refuse must then be ejected from the vehicle. Existing mechanisms for ejecting the compacted refuse often include complex or high-maintenance components, and may not be fully effective in ejecting the refuse. For example, in vehicles that rely on tilting the compartment to eject the compacted refuse, friction between the refuse and the floor of the compartment may prevent the all of the refuse from being discharged from the compartment.

SUMMARY

Implementations of the present disclosure are generally directed to systems and methods for packing refuse and ejecting refuse from an RCV. In one aspect of the disclosure, a packer system of an RCV includes an auger screw that packs refuse material from a hopper into a storage compartment of the RCV and an ejector system to compact and/or eject the refuse from the storage compartment.

One aspect of the invention features a refuse collection vehicle having a packer system, a hopper, and a storage compartment. A wall between the storage compartment and the hopper defines an opening that allows refuse to pass from the hopper to the storage compartment. The packer system includes an auger screw and a driver. The driver rotates the auger screw such that refuse is packed into the storage compartment through the opening. A door can be positioned to cover the opening in the wall to inhibit refuse from passing back through the opening. A door actuator system swings the door to selectively open and close the door on the opening.

In some implementations, the vehicle further includes an actuator system that moves the wall across the floor of the storage compartment while the door covers the opening in the wall to further compact refuse or eject refuse from the vehicle.

In some implementations, the vehicle includes a control system that controls the door actuator system to open and close the door.

In some implementations, the door swings about a hinge point that is offset from the opening in the wall.

In some implementations, the door includes a sweeping member that sweeps refuse from in front of the opening in the wall.

In some implementations, the vehicle includes an automatic side loader that loads refuse into the hopper.

Another aspect of the invention features a refuse collection vehicle having a packer system, a hopper, and a storage compartment. A wall between the storage compartment and the hopper defines an opening that allows refuse to pass from the hopper to the storage compartment. The packer system includes an auger screw and a driver. A driver rotates the auger screw such that refuse is packed into the storage compartment through the opening. The auger screw is coupled to the driver by way of a spline coupling. One of the spline portions of the coupling includes an external spline having teeth spaced around the circumference of the external spline and arcuate webs between the adjacent teeth. The other one of the spline portions includes an internal spline that receives the external spline. An auger screw retaining bolt passes through a bore of the auger screw. The auger screw retaining bolt secures the auger screw to the driver such that the auger screw spline portion of the auger screw is engaged with the driver spline portion.

In some embodiments, the external spline is on an output shaft of the driver. The auger screw includes an internal spline socket that receives the external spline of the output shaft of the driver.

Another aspect of the invention features a refuse collection vehicle having a packer system, a hopper, and a storage compartment. A wall between the storage compartment and the hopper defines an opening that allows refuse to pass from the hopper to the storage compartment. The packer system includes an auger screw and a driver. The driver rotates the auger screw such that refuse is packed into the storage compartment through the opening. A door can be positioned to cover the opening in the wall to inhibit refuse from passing back through the opening. A door actuator system moves the door to selectively open and close the door on the opening. Separate from the auger screw, a packing actuator can push an ejector panel across the floor of the storage compartment while the door is closed on the opening in the wall to further compact refuse in the storage compartment or to eject refuse from the vehicle.

In some implementations, the packing actuator includes a linear actuator.

In some implementations, the auger screw remains stationary in the body of the vehicle as the packing actuator advances the ejector panel of a floor of the storage compartment. It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

Like reference numbers in different figures indicate similar elements.

DETAILED DESCRIPTION

Implementations of the present disclosure are directed to systems, devices, and methods for collecting, packing, transporting, and disposing of refuse. Some implementations include an RCV with a packing system that includes an auger screw and an ejector system.

Implementations may be employed with respect to any suitable type of RCV, with any suitable type of body and/or hopper variants. For example, the RCV may be an automated side loader vehicle. As another example, the RCV can be a commercial front loader (e.g., for dumpster type containers. As another example, the RCV can be a residential front loader. A front loader can be provided with or without an intermediate collection device. The intermediate collection device can be used, for example, to collect residential-sized containers. As another example, the RCV can be a rear loader, with cameras and/or other sensors embedded in an acrylic strip or other suitable component (e.g., across the floor of the rear hopper). In some implementations, an RCV is an all-electric vehicle.

Figure 1:
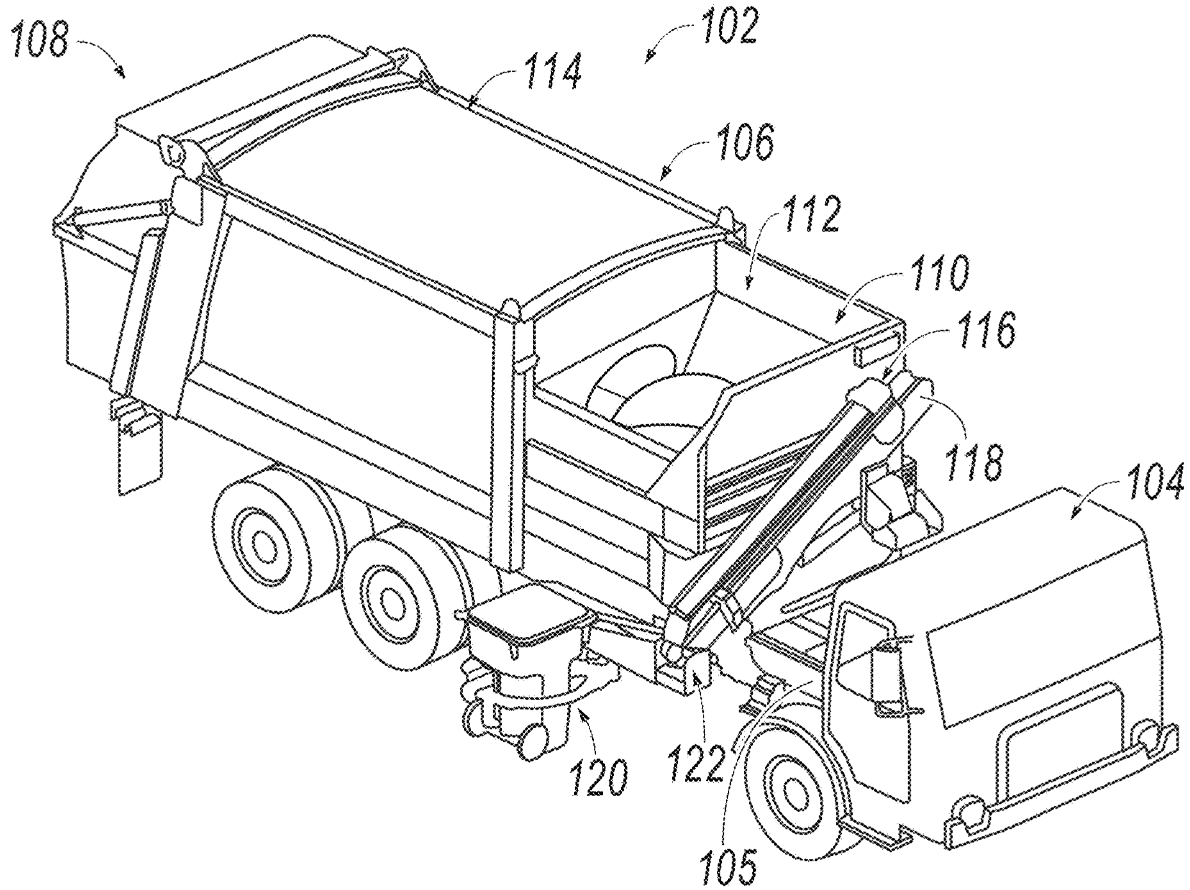
FIG. 1 depicts an example of a refuse collection vehicle including a packer system, according to implementations of the present disclosure.

FIG. 1 depicts an example of refuse collection vehicle including an automatic side loading mechanism and a packer system. Refuse collection vehicle 102 includes a cab 104, a frame 105, a body 106, a tailgate 108, and a packer system 110. Body 106 defines a hopper 112 and a storage compartment 114. A container collection arm 116 is secured to the hopper 112.

The container collection arm 116 includes a telescoping boom 118 and a grasping assembly 120. The grasping assembly 120 is secured to the boom 118 via a rotary actuator 122. The rotary actuator 122 manipulates the grasping assembly 120 to level the container during lifting. Additionally, the rotary actuator 122 initiates dumping of the container into the hopper 112.

The vehicle 102 can be an RCV that operates to collect and transport refuse (e.g., garbage). The refuse collection vehicle can also be described as a garbage collection vehicle, or garbage truck. The vehicle 102 can be configured to lift containers that contain refuse, and empty the refuse in the containers into a hopper of the vehicle 102 and/or intermediate collection device conveyed by the RCV, to enable transport of the refuse to a collection site, compacting of the refuse, and/or other refuse handling activities. The vehicle 102 can also handle containers in other ways, such as by transporting the containers to another site for emptying.

In some implementations, vehicle 102 is an all-electric vehicle. Motive power and various body controls and subsystems on the vehicle (including packing system, ejector system, door actuator system, and contamination detection systems) can be electrically powered.

Vehicle 102 can include various components that are appropriate for the particular type of vehicle. For example, a garbage collection vehicle may be a truck with an automated side loader ("ASL"). Alternatively, the vehicle may be a front-loading truck, a rear loading truck, a roll off truck, or some other type of garbage collection vehicle. A vehicle with an ASL may include body components involved in the operation of the ASL, such as arms and/or a fork, as well as other body components such as a pump and so forth. A front-loading vehicle may include body components such as a hydraulic pump, grabber, and so forth. A rear loading vehicle may include body components such as a pump, blade, tipper, and so forth. A roll off vehicle may include body components such as a pump, hoist, cable, and so forth. Body components may also include other types of components that operate to bring garbage into a hopper (or other storage area) of a truck, compress and/or arrange the garbage in the hopper, and/or expel the garbage from the hopper.

Figure 2:
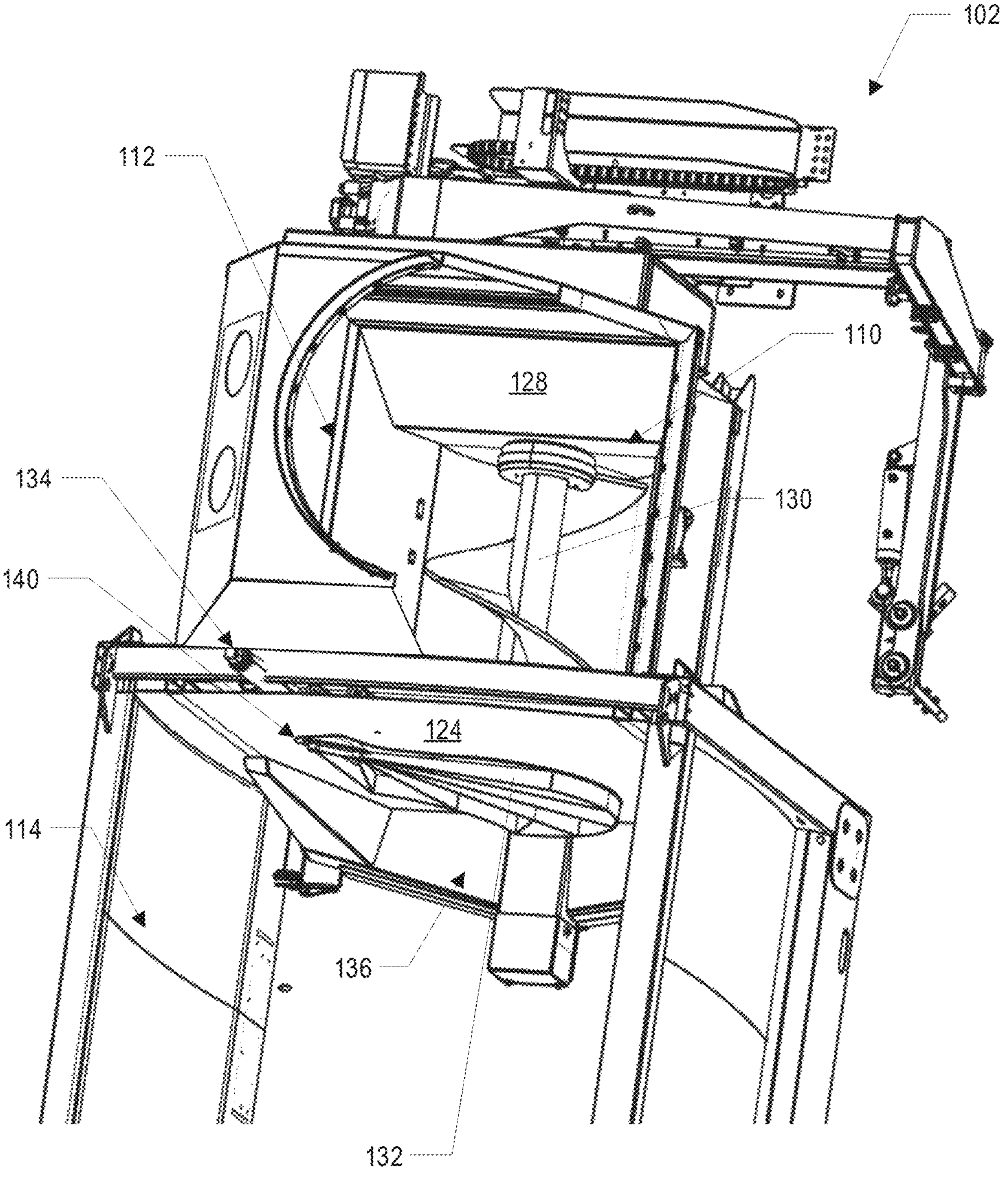
FIG. 2 is an overhead view of a packer system including an auger screw and an ejector panel, according to implementations of the present disclosure.
Figure 12:
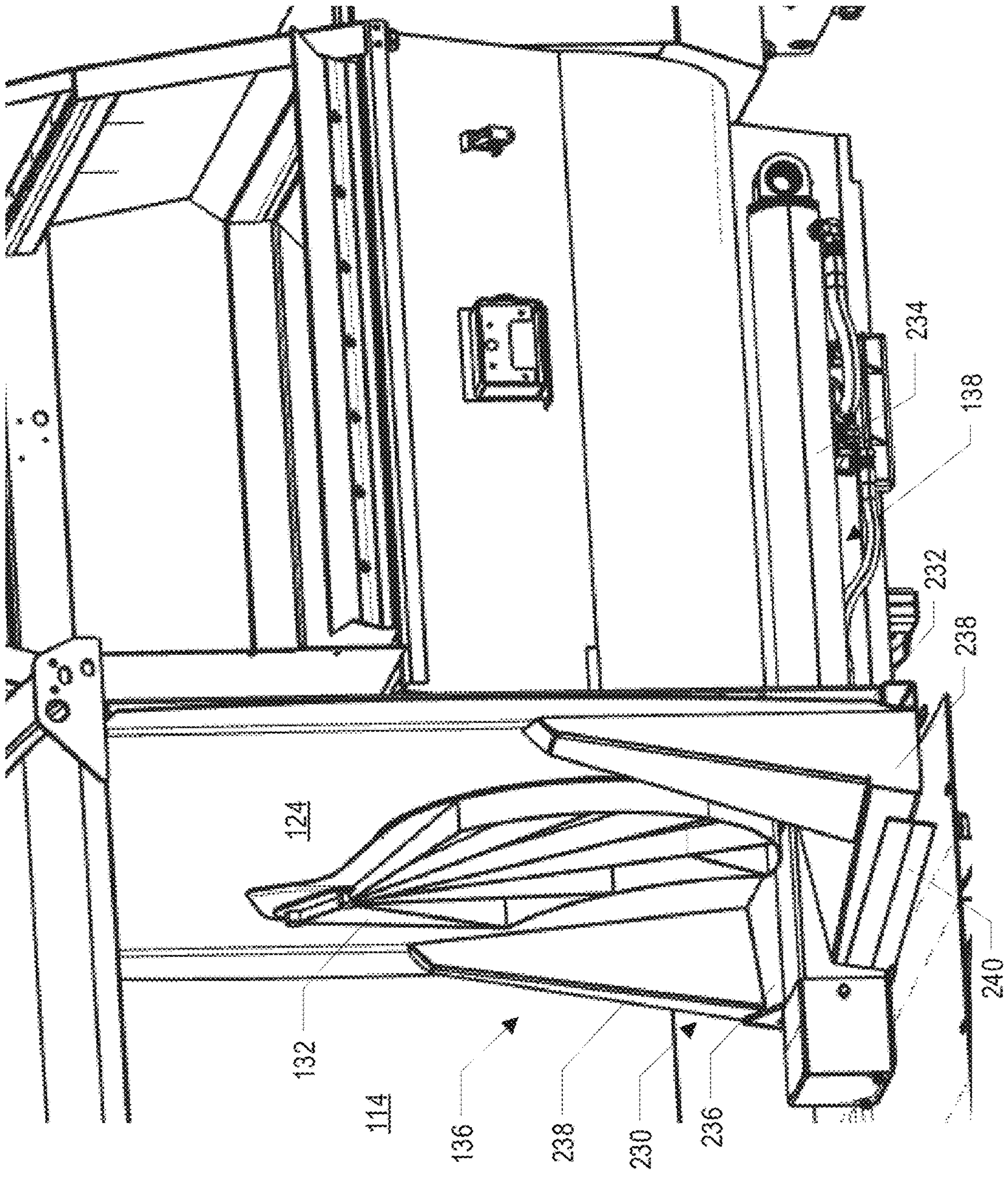
FIG. 12 depicts an example of an ejector and an ejector actuator system.

FIG. 2 is an overhead view of a packer system including an auger screw and an ejector panel. In FIG. 2, the wall 124 separates hopper 112 from storage compartment 114. Packer system 110 includes a drive system 128, an auger screw 130, a door 132, a door actuator system 134, an ejector 136, and an ejector actuator system 138 (as shown in FIG. 12). Door 132 is coupled to swing on wall 124 at hinge joint 140. As will be further described below, door actuator system 134 can be operated to swing door 132 upwardly about a hinge joint 140 to uncover an opening 144 in wall 124 to allow refuse to be conveyed from hopper 112 to storage compartment 114.

Auger screw 130 is coupled to driver 128. When door 132 is open, driver 128 can be operated to rotate auger screw 130 to advance refuse into storage compartment 114. Operation of packer system 110 may compact or eject material in storage compartment 112, depending on whether tailgate 108 of vehicle 102 is open or closed. If tailgate 108 is closed, the material in storage compartment 114 is held, such that operation of the packer system 110 packs the material in storage compartment 114. If tailgate 108 is open, refuse material may be ejected from storage compartment 114. In some instances, operation of packer system 110 will both compact and eject refuse. As will be described in further detail below, in some instances, after material is pushed into storage compartment 114 by auger screw 130, the refuse can be further compacted.

Figure 3:
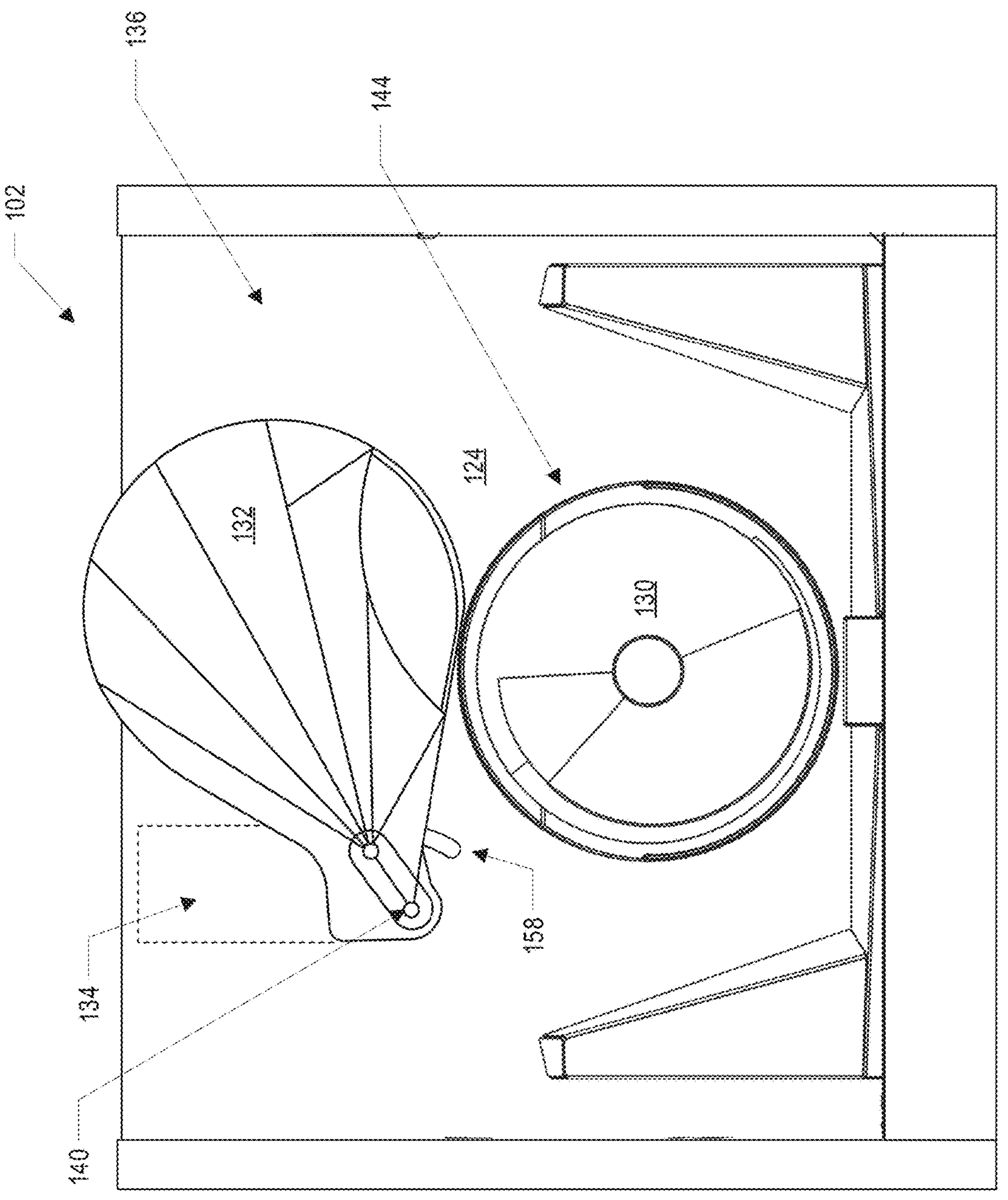
FIG. 3 is a rear view of a packer system with a door in a raised position, according to implementations of the present disclosure.

FIG. 3 is a rear view of a packer system with a door in a raised position. Door actuator system 134 is coupled to door 132. When door 132 is moved by door actuator system 134 to the raised position shown in FIG. 3, opening 144 in wall 124 is uncovered to allow refuse to be advanced by auger screw 130 to move refuse that has been received by hopper 112 into storage compartment 114. When auger screw 130 is being operated to compact refuse into storage compartment 114, door 132 may be maintained in an open position.

Figure 4:
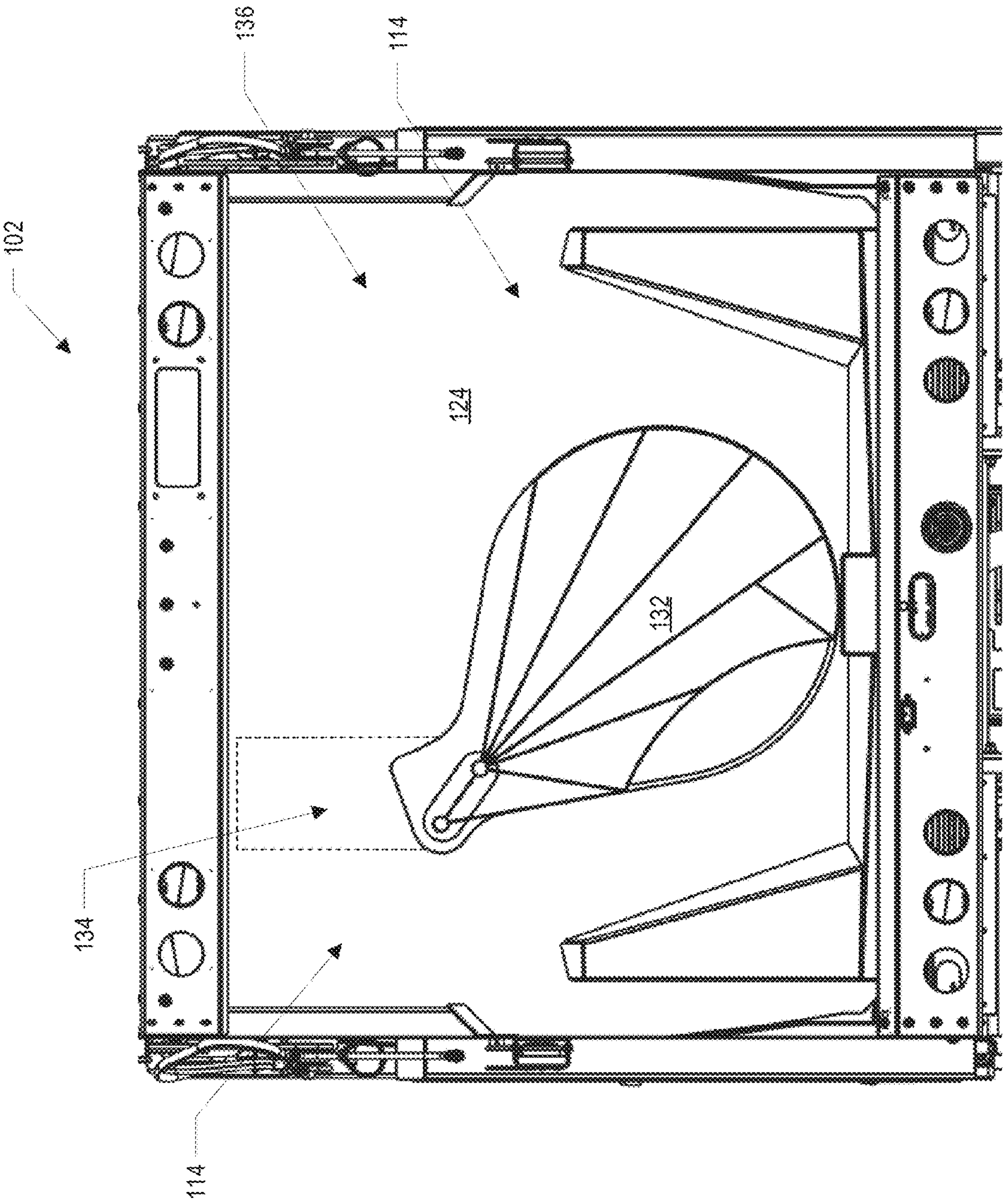
FIG. 4 is a rear view of a packer system with a door in a lowered position, according to implementations of the present disclosure.

FIG. 4 is a rear view of a packer system with a door in a lowered position. When auger screw 130 is not in use, door actuator system 134 can be operated to move door 132 to a closed position over opening 144. Door 132 may keep refuse that has been pushed into storage compartment 114 from backing out into hopper 112 (not pictured in FIG. 4). In some implementations, door 132 is moved to the closed position when ejector actuator system 138 is operated to move ejector 136 toward the rear of vehicle 102 to eject or further compact refuse in storage compartment 114, thereby inhibiting refuse from migrating back through opening 144.

Figure 5:
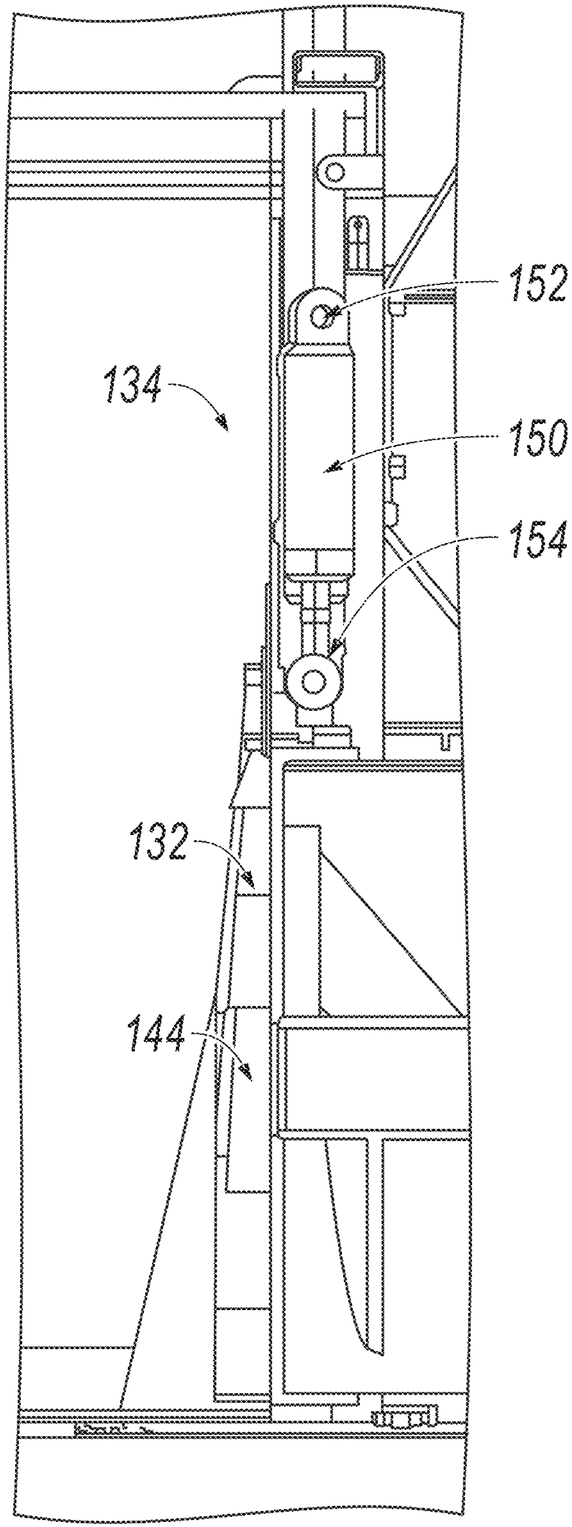
FIG. 5 depicts an example of a door actuator system.

FIG. 5 depicts an example of a door actuator system. Door actuator system 134 includes linear actuator 150, fixed mount 152, and door actuator coupling 154. Door actuator system 134 also includes or is connected to a control system (not shown in FIG. 5). In one example, door actuator system 134 is coupled to a control system such as described below with respect to FIG. 23.

Linear actuator 150 can be operated by the control system to selectively position door 132 (e.g., raise and lower door 132). As linear actuator 150 is operated, door coupling 154 may trace curved slot 158 (see FIG. 3) as door 132 swings about hinge joint 140.

In one implementation, the powertrain motor, auger screw 230, door actuator system 134, and ejector actuator system 138 are all electrically powered. In some implementations, the powertrain motor, auger screw 230, door actuator system 134, and ejector actuator system 138 receive power from a common electrical energy storage system (e.g., a common battery pack). In other implementations, one or more of auger screw 230, door actuator system 134, and ejector actuator system 138 receive power from a different electrical energy storage system than the powertrain motor.

Figure 6:
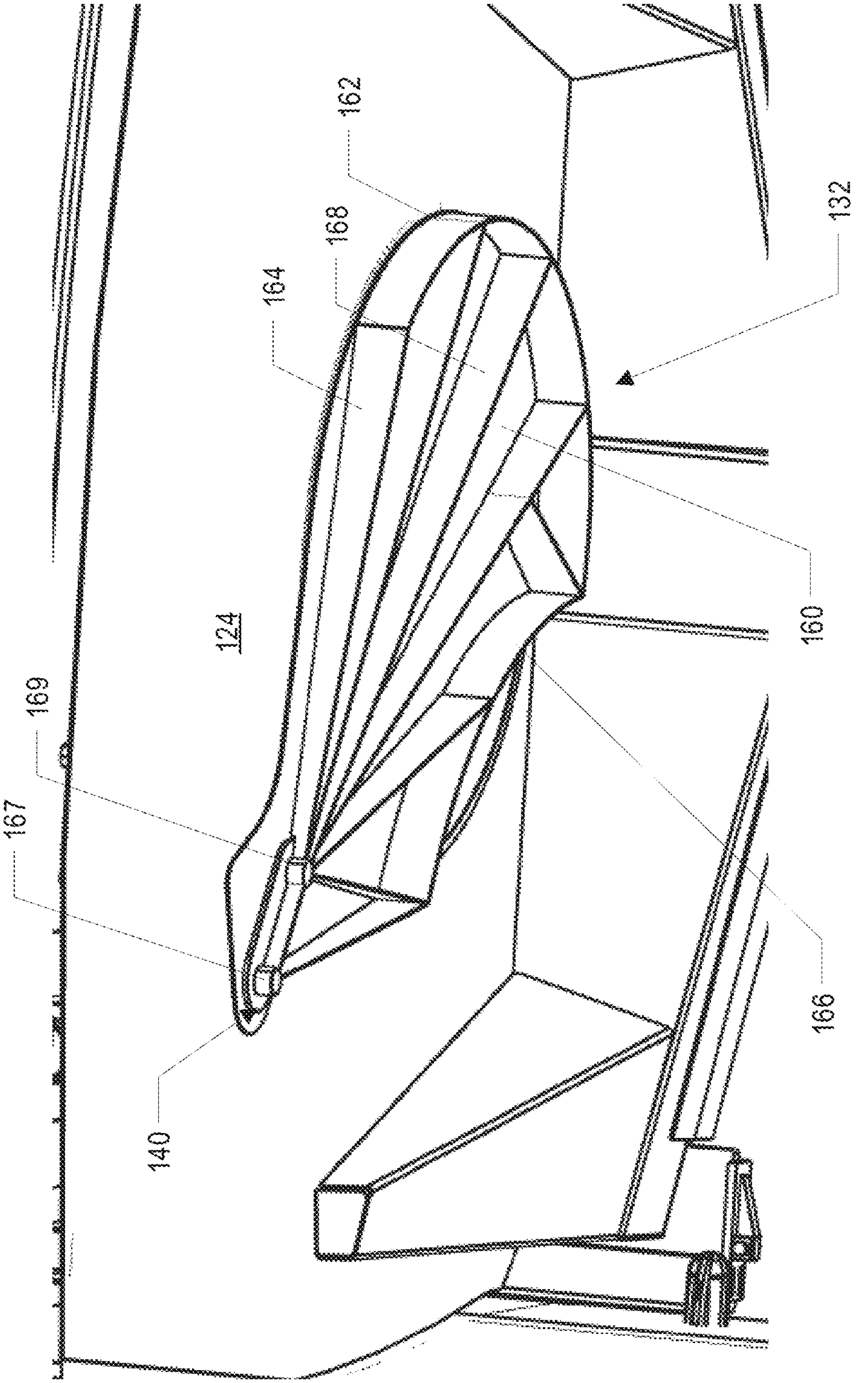
FIG. 6 is an overhead view of a door over an opening in a wall of a packer system, according to implementations of the presented disclosure.

FIG. 6 is an overhead view of a door over an opening in a wall of a packer system. Door 132 includes a plate 160, a nose rib 162, an upper rib 164, a lower rib 166, and interior ribs 168. Door 132 is coupled to hinge joint 140 by way of pin 167. Door 132 is coupled to door actuator coupling 154 (not pictured) by way of pin 169. Nose rib 162, upper rib 164, lower rib 166, and interior ribs 168 may reinforce plate 160 to bear weight or external loads on door 132. In some implementations, door 132 can be operated to sweep refuse from in front of opening 144 (shown in FIG. 3). With door 132 shown in FIG. 6, for example, any or all of the exterior ribs, namely, nose rib 162, upper rib 164, or lower rib 166, can serve as sweeping members to push refuse out of the path of door 132 as it is swung up or down to cover or uncover opening 144.

Figure 7:
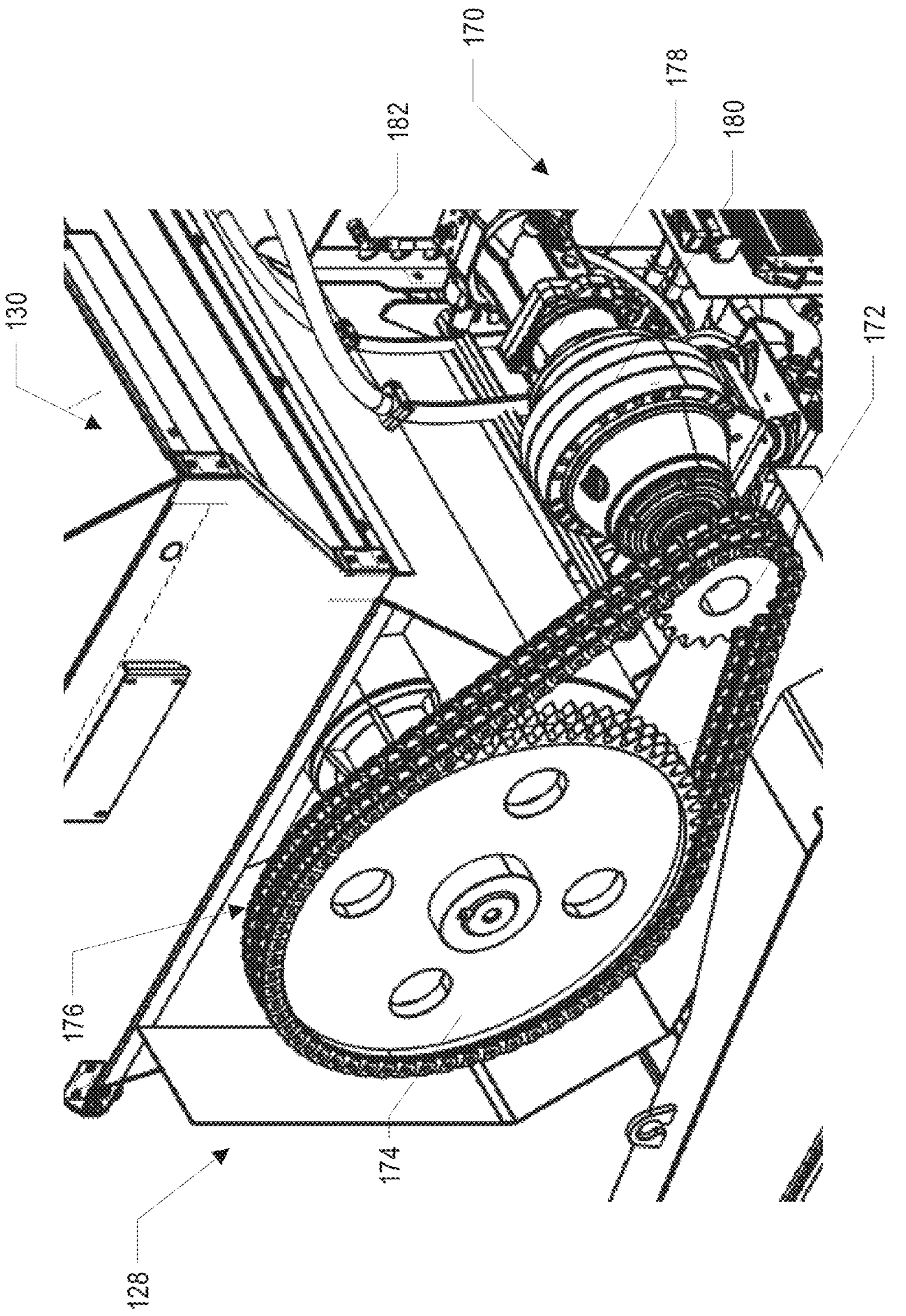
FIG. 7 depicts an example of a drive system.

Referring now to FIG. 7, drive system 128 includes a drive unit 170, drive sprocket 172, main sprocket 174, and chain drive 176. Drive unit 170 includes a motor 178, a reducer 180, and a control system 182. Drive sprocket 172 is installed on an output shaft of reducer 180. Motor 178 can be coupled to control system 182. Drive system 128 is coupled to auger screw 130 by way of chain drive 176.

Figure 8:
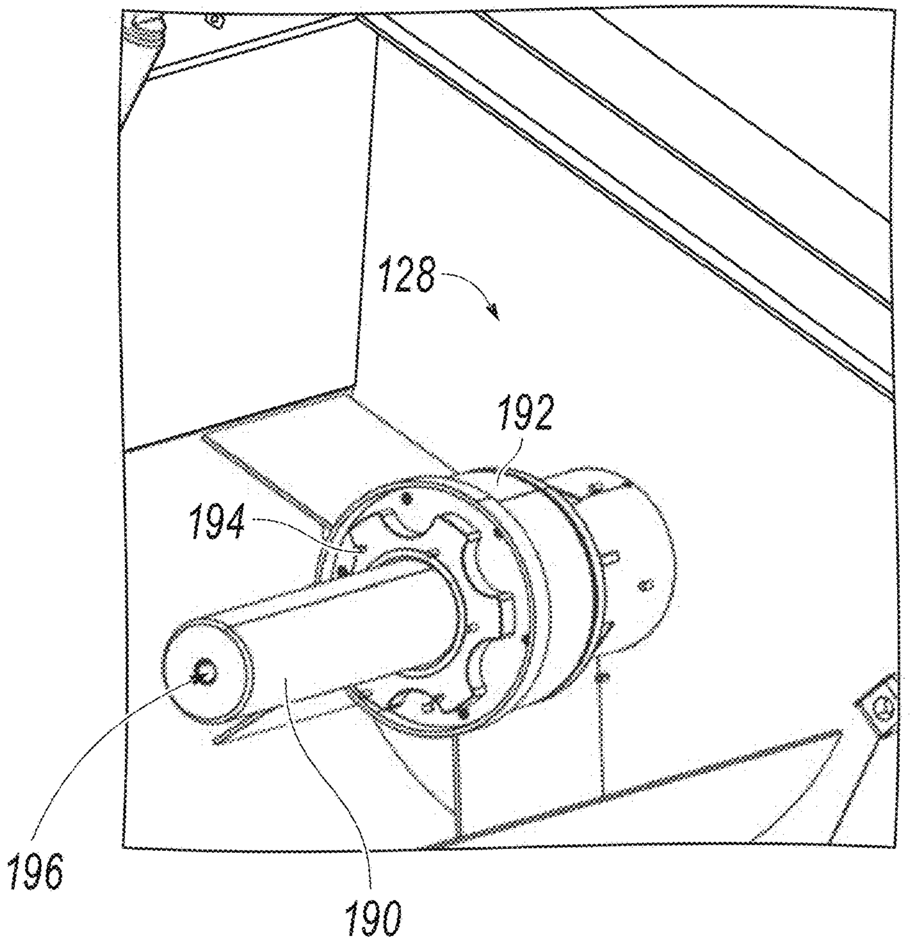
FIGS. 8 and 9 depict an example of a spline connection between an auger screw and a driver.
Figure 9:
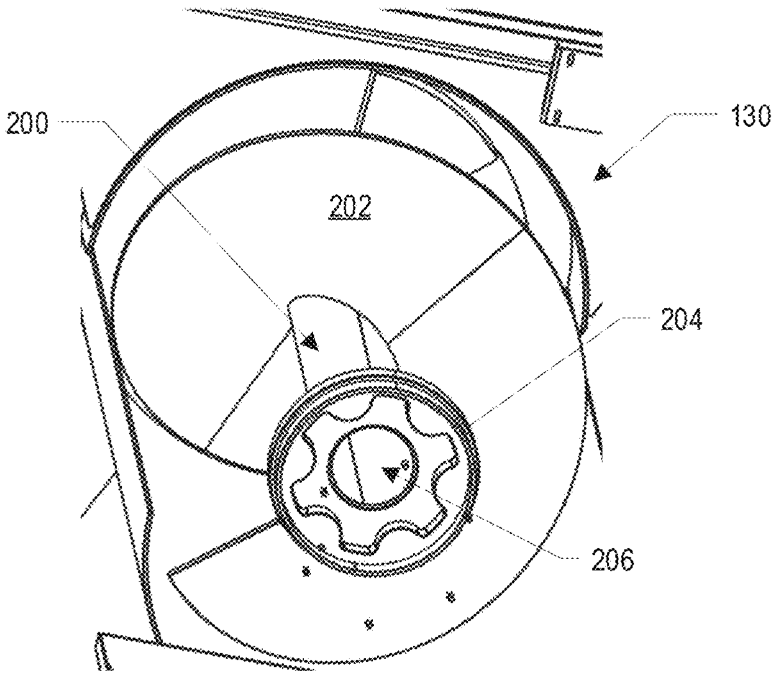

In some implementations, an auger screw is coupled to the drive system by way of a spline coupling. The spline coupling may allow for the auger screw to be quickly disconnected from the drive system for maintenance, repair, or replacement. FIGS. 8 and 9 depict mating portions of a coupling for an auger screw according an illustrative implementations. Referring to FIG. 8, drive system 128 includes a drive output shaft 190, a drive shaft bearing assembly 192, and an external spline 194. External spline 194 is attached to drive output shaft 190. Drive output shaft 190 may rotate on bearings in drive shaft bearing assembly 192. A tapped hole 196 is included at the end of drive output shaft 190.

Referring to FIG. 9, auger screw 130 includes a hollow cylindrical shaft 200, helical blade 202, and internal spline socket 204. Hollow cylindrical shaft 200 includes a bore 206 for receiving drive output shaft 190. To connect auger screw 130 to drive system 128, auger screw 130 may be slid into place on drive output shaft 190 such that internal spline socket 204 is aligned with external spline 194. During operation of packer system 110, external spline 194 engages internal spline socket 204 to rotate auger screw 130.

Figure 10:
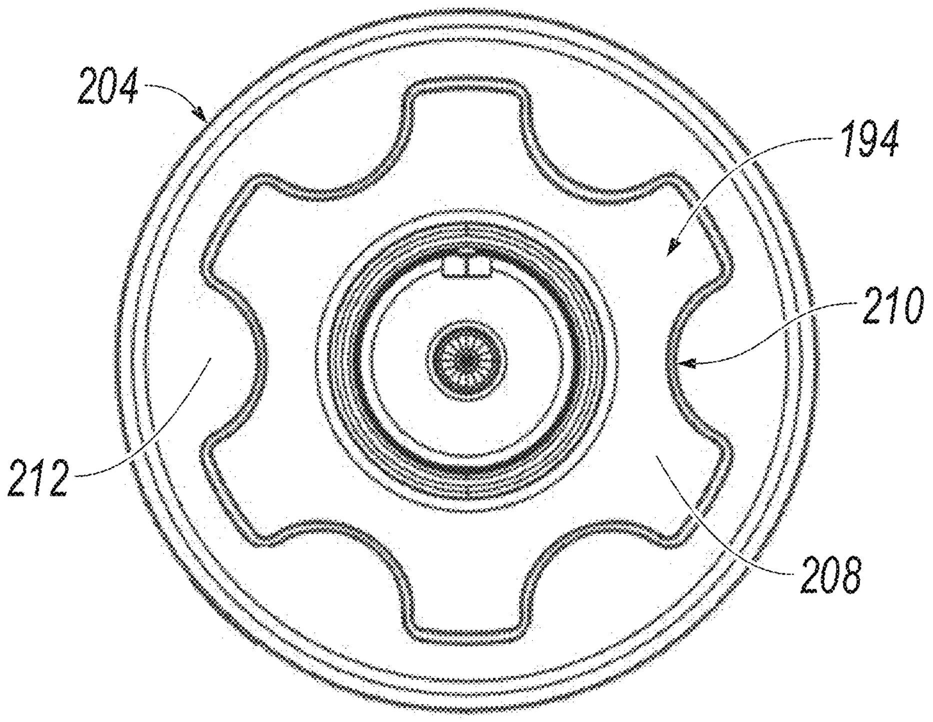
FIG. 10 illustrates an example of a spline connection between an auger screw and a drive output shaft.

FIG. 10 illustrates an example of a spline connection between an auger screw and a drive output shaft. External spline 194 includes teeth 208 disposed around the circumference of the spline. Arcuate webs 210 are between each adjacent pair of teeth. In one example, a spline includes six teeth. A spline may, however, have any number of teeth. Internal spline socket 204 may include arcuate ridges 212 that each correspond to one of arcuate webs 210 on external spline 194. In one implementation, the depth of each arcuate web is about 30% of the width of the web. In operation, the side walls of teeth may engage on the arcuate adjacent ridges 212 of internal spline socket 204.

Figure 11:
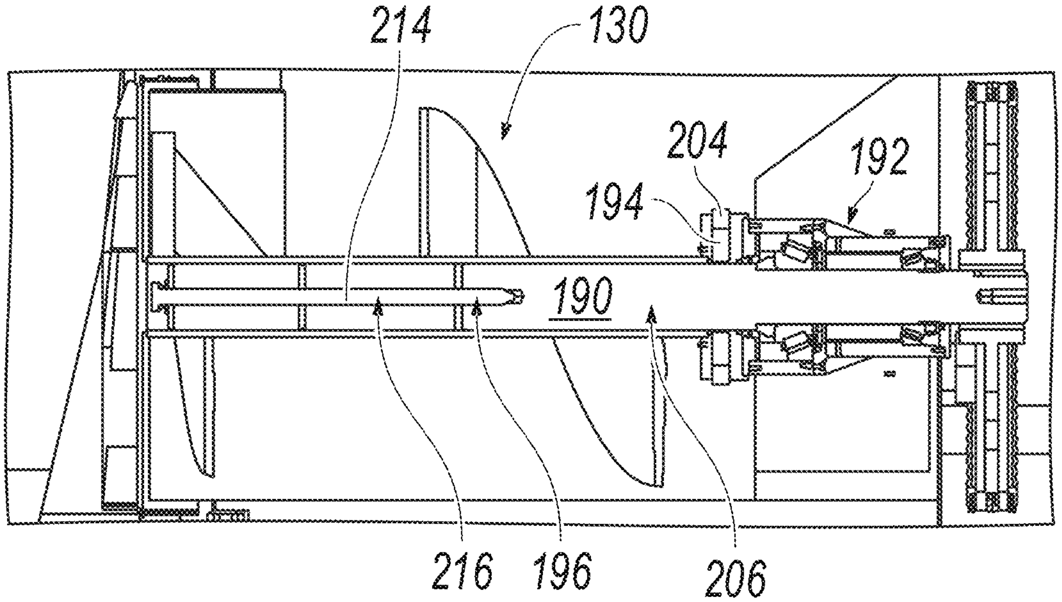
FIG. 11 is a cross sectional view of a packer system including an auger screw, according to implementations of the present disclosure.

In some implementations, an auger screw is attached to a driver mechanism by way of a single fastener. FIG. 11 is a cross sectional view of a packer system including an auger screw according to one example. Auger screw 130 is installed on drive output shaft 190 by sliding auger screw 130 onto drive output shaft 190 such that the output drive shaft is received in bore 206, and internal spline socket 204 and external spline 194 mesh. A retaining bolt 214 can be passed through a bore 216 of auger screw 130 and threaded into tapped hole 196 of drive output shaft 190 and torqued to firmly secure auger screw 130 on the drive output shaft 190. When service is required on auger screw 130, auger screw 130 can be released from drive output shaft 190 by removing retaining bolt 214.

In some implementations, refuse that has been packed into a storage compartment by an auger system can be further compacted or ejected from a vehicle by an ejector panel. As an example, auger screw 130 can be rotated until all refuse from the hopper has been packed into storage compartment 114. During subsequent packing or ejection with ejector 136, door 132 can be closed over opening 144 to keep refuse that has been pushed through opening 144 from coming back through the opening.

In some implementations, a packer system uses an auger screw and telescopic linear actuators to achieve a higher rate of compaction. In some cases, the auger screw is primarily used to clear the hopper of trash and provide primary compaction forces to the payload. The eject cylinders may be used for compaction and ejection. In certain implementations, the ejector cylinders provide a secondary compaction force to clear the area in the body immediately behind the auger, relieving resistance to additional packing (payload) on the auger screw.

FIG. 12 depicts ejector 136 and ejector actuator system 138. In this example, ejector 136 includes an ejector base assembly 230, wall 124, and an ejector frame 232. In this implementation, wall 124, which separates hopper 112 from storage compartment 114, is incorporated into ejector 136. Door 132 is coupled to wall 124.

Ejector actuator system 138 includes linear actuators 234 coupled on opposing sides of ejector base assembly 230. Linear actuators 234 may be telescoping linear actuators. Linear actuators 234 are mounted longitudinally.

Ejector base assembly 230 includes center member 236 and side members 238. Center member 236 and side members 238 may push refuse toward the rear of storage compartment 114 as ejector 136 is operated to compact or eject refuse. Lead panels 240 may help keep refuse from lodging on the floor of storage compartment 114.

Figure 13:
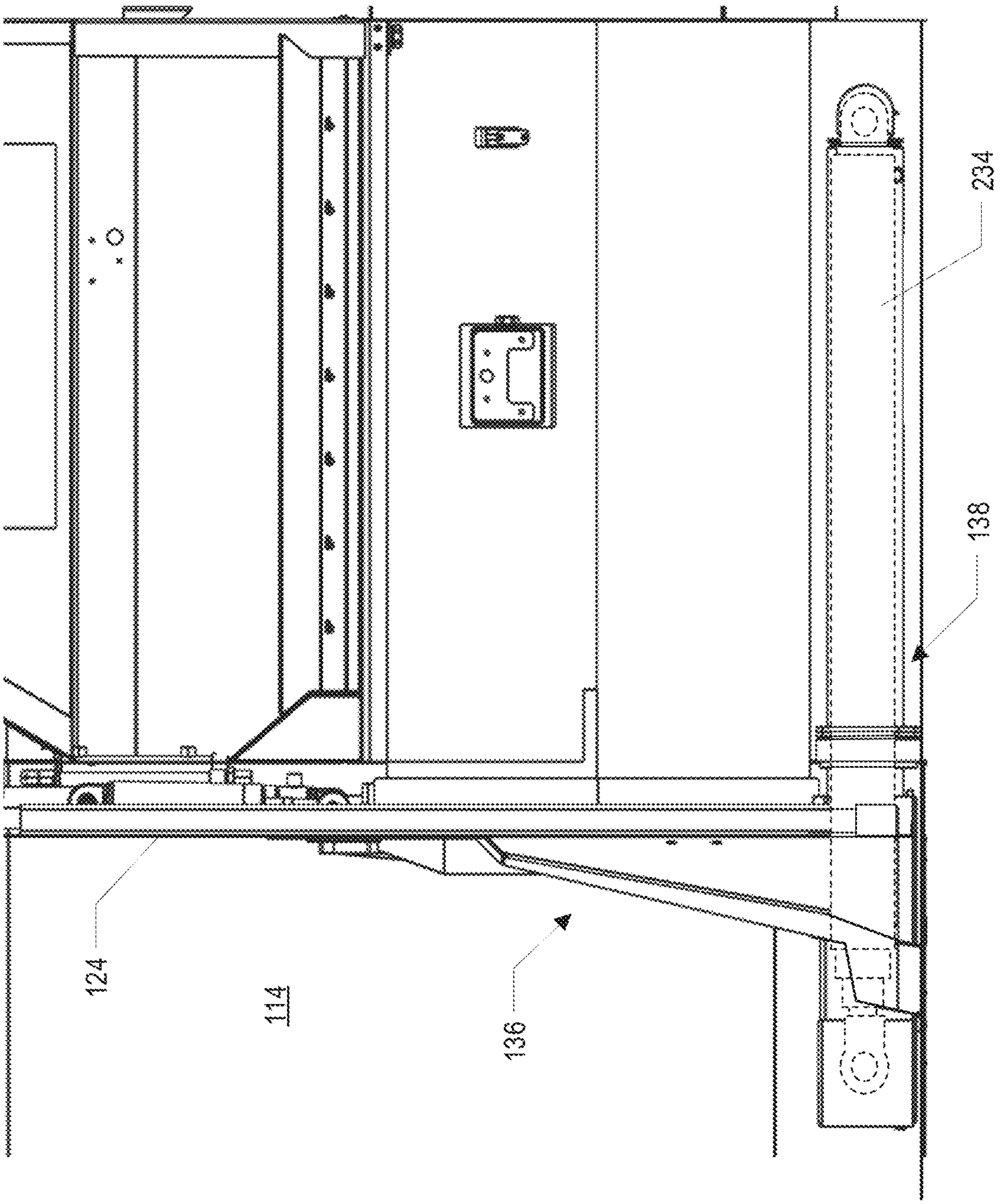
FIG. 13 is a side view of a packing system with an ejector and an ejector actuator system, according to implementations of the present disclosure.

Referring to FIG. 13, ejector actuator system 138 includes linear actuators 234. Linear actuators 234 may be multiple-telescoping actuators. In this example, telescoping linear actuators 234 include three telescoping sections. Linear actuators 234 can be operated to advance ejector 136 in storage compartment 114.

Linear actuators (including, for example, linear actuator 150 and linear actuator 234) can be any device or combination of devices that creates motion in a straight line. In some implementations, linear actuator 150 and linear actuator 234 are electric actuators. An electric actuator can include any of various devices that uses electrical power to produce motion. Examples of linear actuators include lead screw actuators, push-pull chain actuators, chain drive actuators, belt drive actuators, ball screw actuators, rack-and-pinion actuators, hydraulic actuators, and pneumatic actuators. Linear actuator 150 and linear actuator 234 can be telescoping or non-telescoping.

In certain implementations, linear actuator 150 or linear actuator 234 includes a hydraulic cylinder. The hydraulic cylinder can receive pressurized hydraulic fluid from a hydraulic system.

Figure 14:
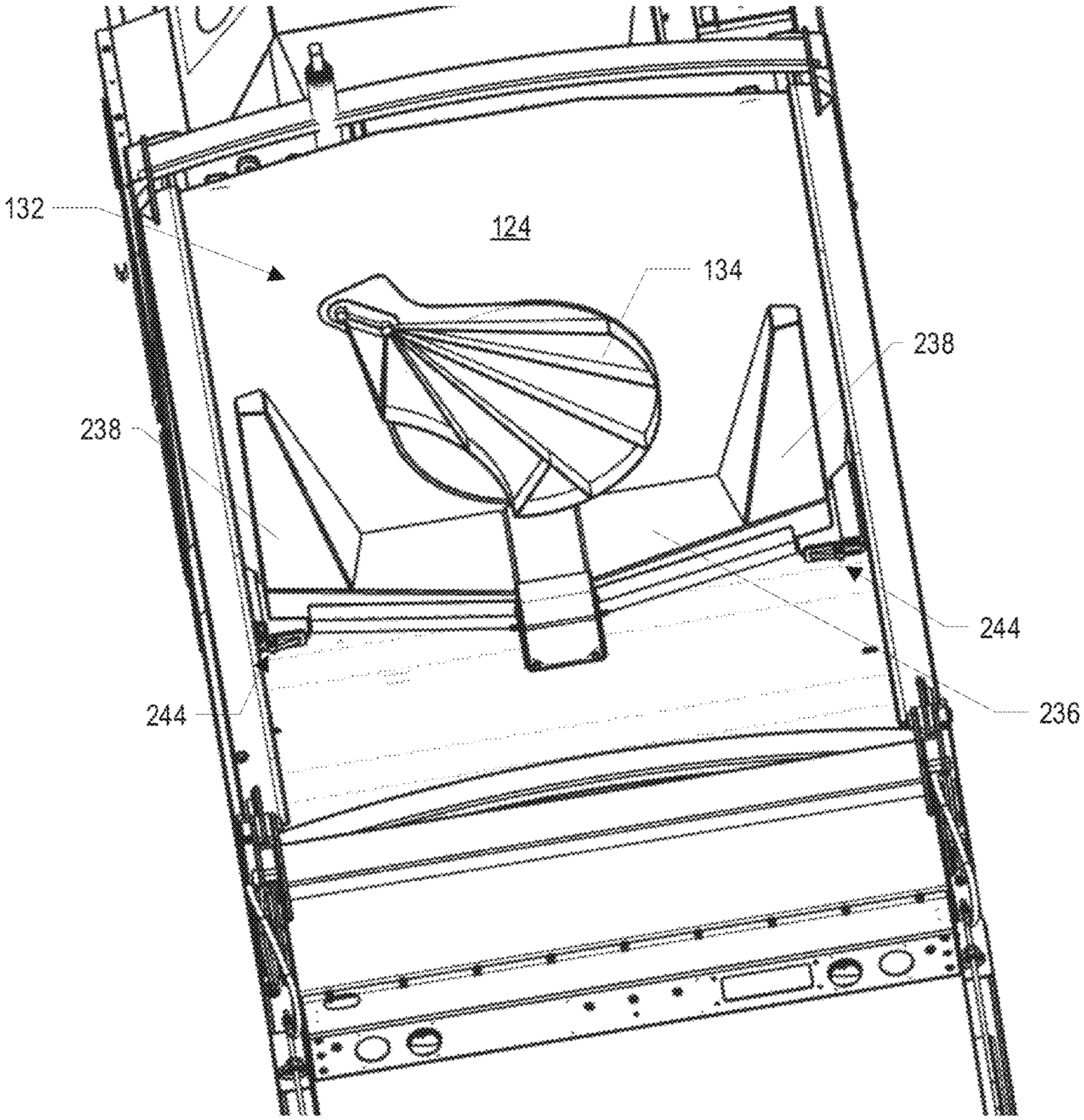
FIG. 14 is an overhead view of an ejector, according to implementations of the present disclosure.

Referring to FIG. 14, body 106 of vehicle 102 includes latch mechanism 244 on opposing side walls of storage compartment 114. In some implementations, latch mechanisms 244 are operated by a control system to selectively hold or release ejector 136 (and its component members center member 236 and side members 238) from advancing toward the rear of vehicle 102.

In the packer system described above with respect to FIGS. 12-14, the auger system remains stationary while the ejector panel is moved toward the rear of the vehicle. In other implementations, the ejector panel is included on a frame that also carries the auger system. In such systems, the auger may move with the ejector panel as the ejector panel is driven to the rear of the vehicle to compact or eject the refuse.

Figure 15:
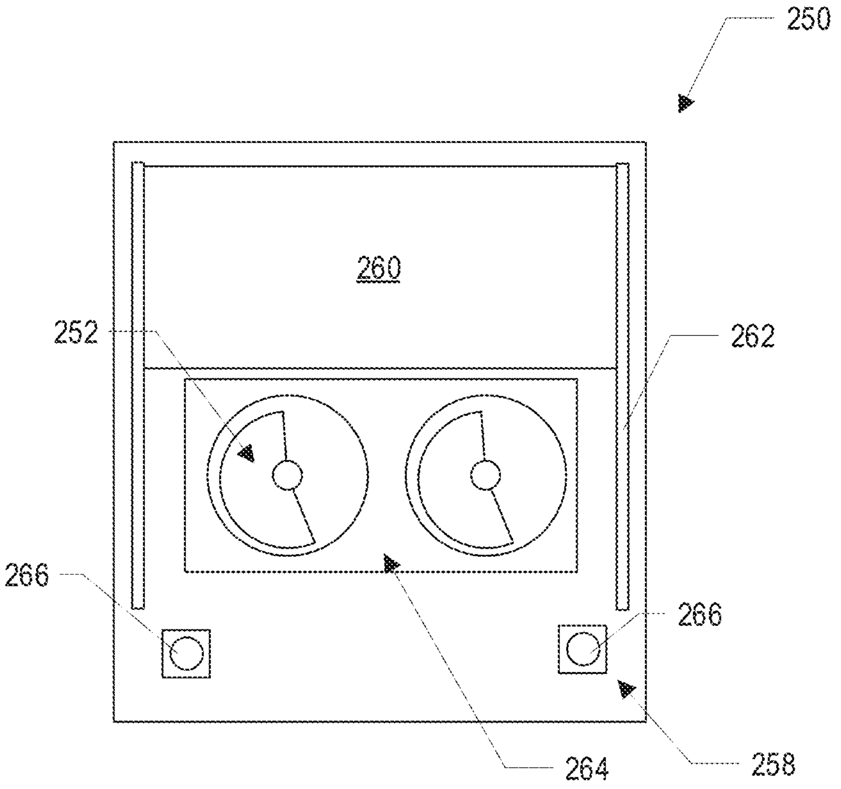
FIGS. 15 and 16 depicts a packer system for an RCV according to an alternative implementation in which auger screws are advanced on a common carrier with an ejector panel
Figure 16:
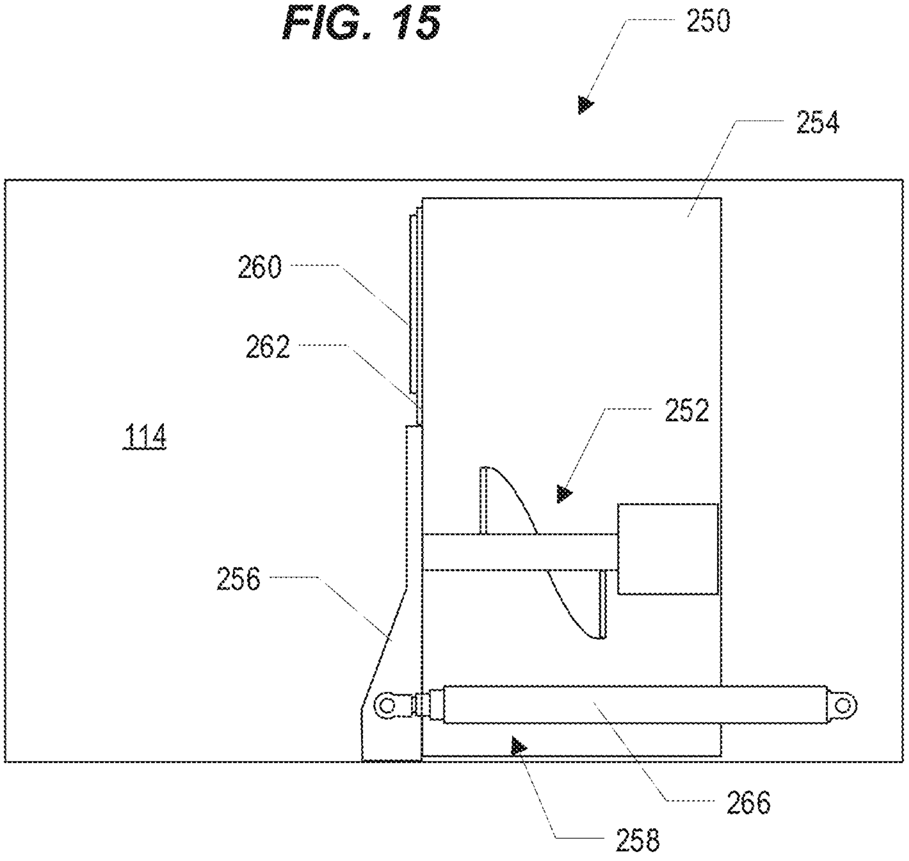

FIGS. 15 and 16 depict a packer system for an RCV according to an alternative implementation in which auger screws are advanced on a common carrier with an ejector panel. FIG. 15 is a rear view of the packer system and FIG. 16 is a side view of the packer system. Packer system 250 includes auger system 252, carrier frame 254, ejector 256, ejector actuator system 258, and sliding door 260.

Sliding door 260 rides on door tracks 262. Sliding door 260 can be selectively moved to open and close opening 264.

Ejector actuator system 258 includes linear actuators 266. Ejector actuator system 258 can be operated to advance ejector 256 along the floor of storage compartment 114.

Figure 17:
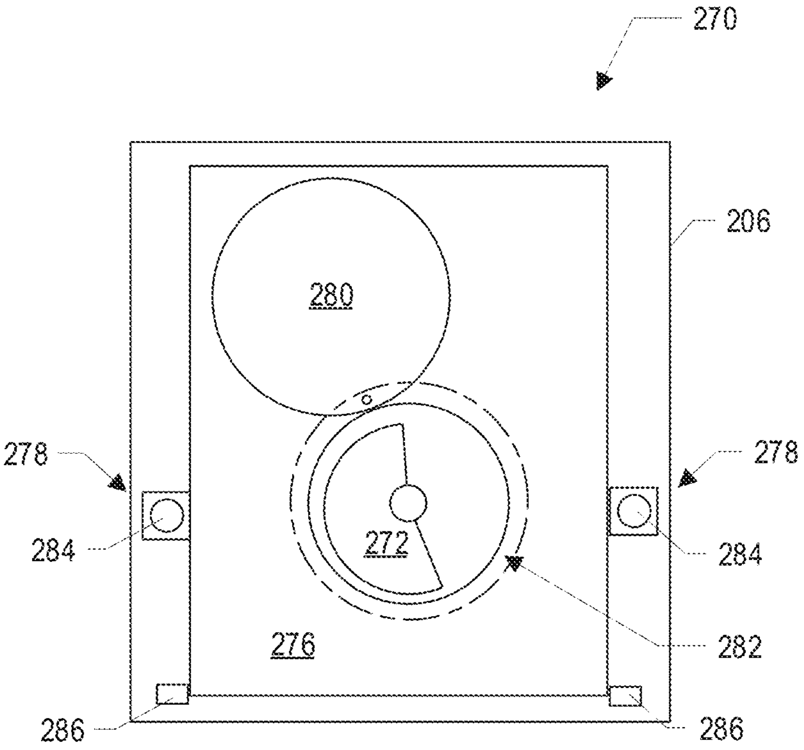
FIGS. 17 and 18 depicts a packer system for an RCV according to another alternative implementation.
Figure 18:
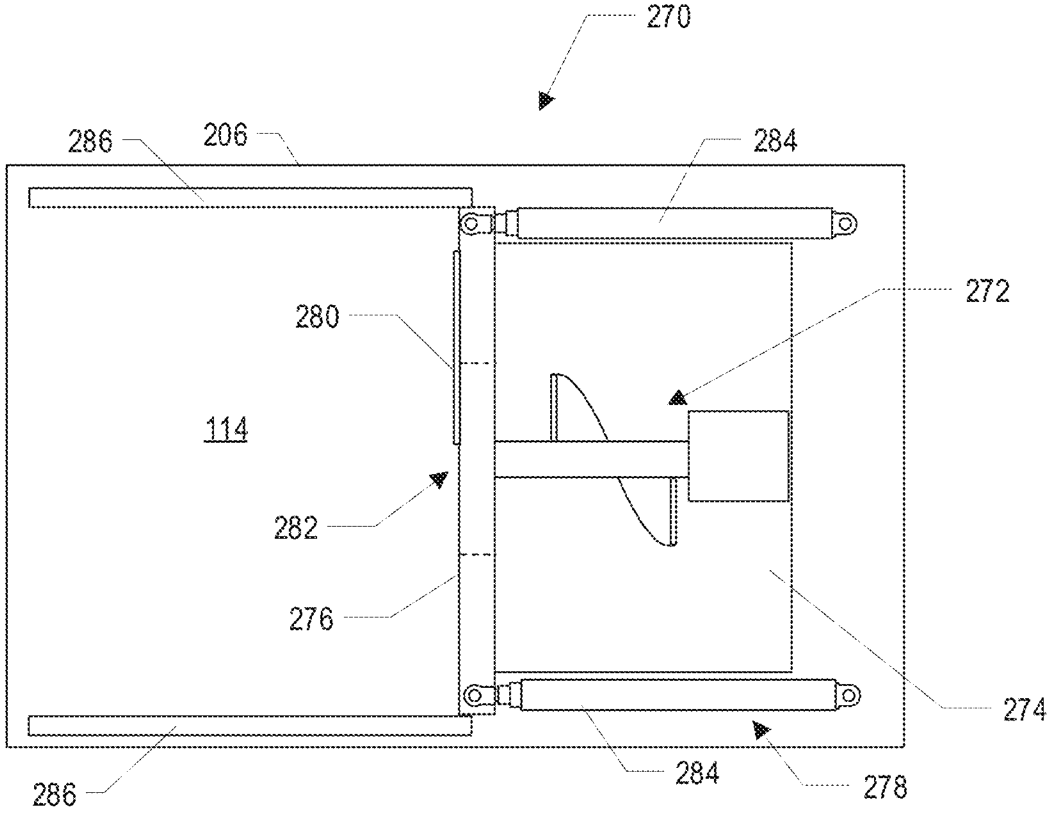

FIGS. 17 and 18 depict a packer system for an RCV according to another alternative implementation. FIG. 17 is a rear view of the packer system and FIG. 18 is a top view of the packer system. Packer system 270 includes auger system 272, carrier frame 274, ejector 276, ejector actuator system 278, and door 280. Door 280 can be selectively swung inward and outward to open and close opening 282.

Ejector actuator system 278 includes linear actuators 284. Ejector actuator system 278 can be operated to advance ejector 276 along the floor of storage compartment 114. Body 206 of the vehicle includes tracks 286. Engagement of ejector 276 on tracks 286 may maintain the base of ejector 276 in line and at floor level as ejector 276 is advanced toward the rear of the vehicle and refuse is compacted or ejected from the vehicle.

Figure 19:
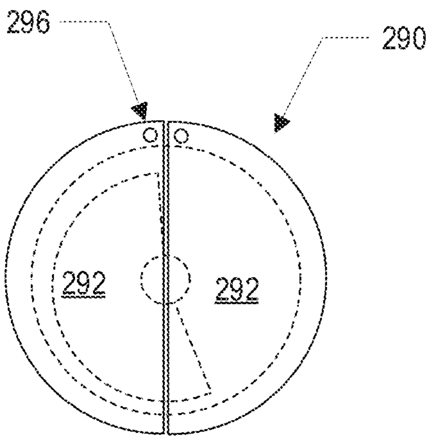
FIGS. 19 and 20 depict an alternate embodiment of a door that can be incorporated into an auger system.
Figure 20:
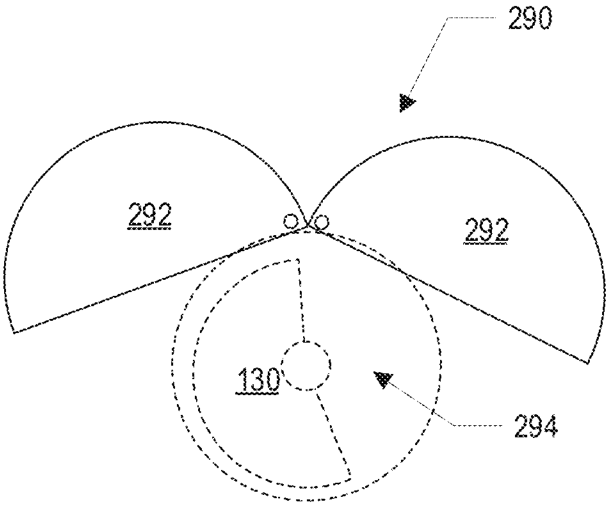

FIGS. 19 and 20 depict an alternate embodiment of a door that can be incorporated into an auger system. Door 290 includes left and right hinged sections 292. To reveal opening 294 in front of auger screw 130, a door actuator system may swing out left and right hinged sections 292 in opposing directions about hinge points 296 such that sections 292 are moved from the positions shown in FIG. 19 to the positions shown in FIG. 20.

Figure 21:
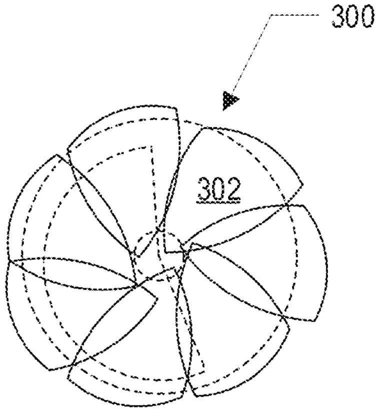
FIGS. 21 and 22 depict another alternate embodiment of a door that can be incorporated into an auger system.
Figure 22:
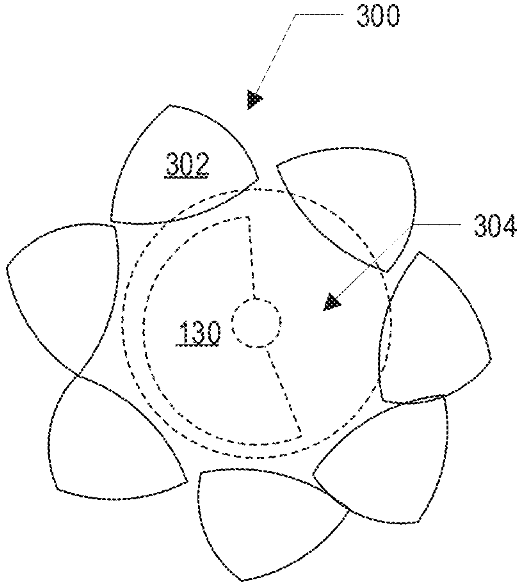

FIGS. 21 and 22 depict another alternate embodiment of a door that can be incorporated into an auger system. Door 300 is in the form of radially arranged door segments 302 that collectively cover opening 304 in front of auger screw 130. To open door 300, an actuator system may be used to swing or slide door segments 302 from the positions shown in FIG. 21 to the positions shown in FIG. 22.

In various implementations described above, auger systems, plate ejector systems, and door actuator systems use hydraulic motors. In other implementations, any or all of an auger system, ejector actuator system, or door actuator system may include electric motors. In one example, an all-electric RCV uses electric motors for an auger screw system, a plate ejector system, and a door actuator systems.

In various examples described above, a packer system includes a single linear actuator. In other implementations, a packer system can include two or more linear actuators (see, for example, FIGS. 15 through 18).

In various examples described above, a packer system includes a single auger screw. In other implementations, a packer system can include two or more auger screws (see, for example, FIGS. 15 and 16).

In certain examples shown above, ejector actuator system 138 or door actuator system 134 are shown for illustrative purposes as including a hydraulic actuator. As noted previously, however, linear actuators for an ejector or door can be other types of actuators, including, for example, an electric actuator.

In various implementations described above, an actuator for an ejector or door is described and shown as a linear motion device. Actuators for an ejector or door can, however, produce other types of motion. For example, an actuator for a door or ejector can be a rotary motion device.

Sensors can be included on various components of a packer system, including, for example, auger screw 130, door 132, or ejector 136. A control system can be coupled to the packer sensors. In one embodiment, each of drive unit 170, auger screw 130, door actuator system 134, and ejector actuator system 138 includes sensors that are coupled a control system. In some implementations, a control system adjusts the auger system drive unit or the ejection actuator system to achieve the desired forces on an ejector. In one example, a control system is as described below relative to FIG. 23. In certain implementations, a packer system can include load cells to measure compression and traction forces as the ejector is advanced or retracted or the auger system is rotated. A packer system can include other sensors. For example, packer system 110 can include additional load sensors, position sensors, angle sensors, or pressure sensors. Operation of the packer system can be controlled based on the information provided by the sensors.

In some implementations, a packer system includes door sensors to sense position, angle, load or other characteristics about a door, such as door 132. Auger screw rotation, ejector actuation, or door actuation can be controlled based on information from the door sensors. As one example, if a door actuator is unable to move from a closed to open position due to blockage by refuse in the path of the door, the auger screw and/or ejector actuator system can be operated to cause the refuse to be dislodged. In a door that includes a sweeping element (such as the exterior ribs described above relative to FIG. 6), the door actuator can be operated in a sweeping mode to clear refuse from in front the auger screw opening.

In some implementations, vehicle 102 includes one or more cameras. Cameras can be used, for example, to detect or monitor the position or state of refuse in the vehicle, the position or state of vehicle sub-systems or their components, or other characteristics. As used herein, a "camera" includes any device that can be used to capture an image. Images can include still images and video images. A camera can include one or more image sensors. A camera can also include other types of sensors (e.g., audio sensors, heat sensors). Cameras and/or sensor devices can include, but are not limited to, one or more of the following: visible spectrum cameras, thermal (IR) cameras, temperature sensors, pressure sensors, IR sensors, UV sensors, ultrasonic (ultrasound) sensors, Doppler-based sensors, time-of-flight (TOF) sensors, color sensors (e.g., for determining, RGB data, XYZ data, etc., with or without IR channel blocking), microwave radiation sensors, x-ray radiation sensors, radar, laser-based sensors, LIDAR-based sensors, thermal-based sensors, spectral cameras (e.g., including hyper- and/or ultra-spectral imaging technology that use spectral fingerprints to classify very small objects at high speeds), and so forth.

Control of packer system 110 may be carried out manually, automatically, or a combination thereof. In some implementations, a control system collects data from packer system sensors and/or other operational sensors and controls the packer system or other components of vehicle based on the information. For example, a control system may automatically shut down or reduce the speed of a drive system if a compression load (or another measured characteristic of the refuse vehicle's system) is outside an established range or exceeds an established threshold.

Figure 23:
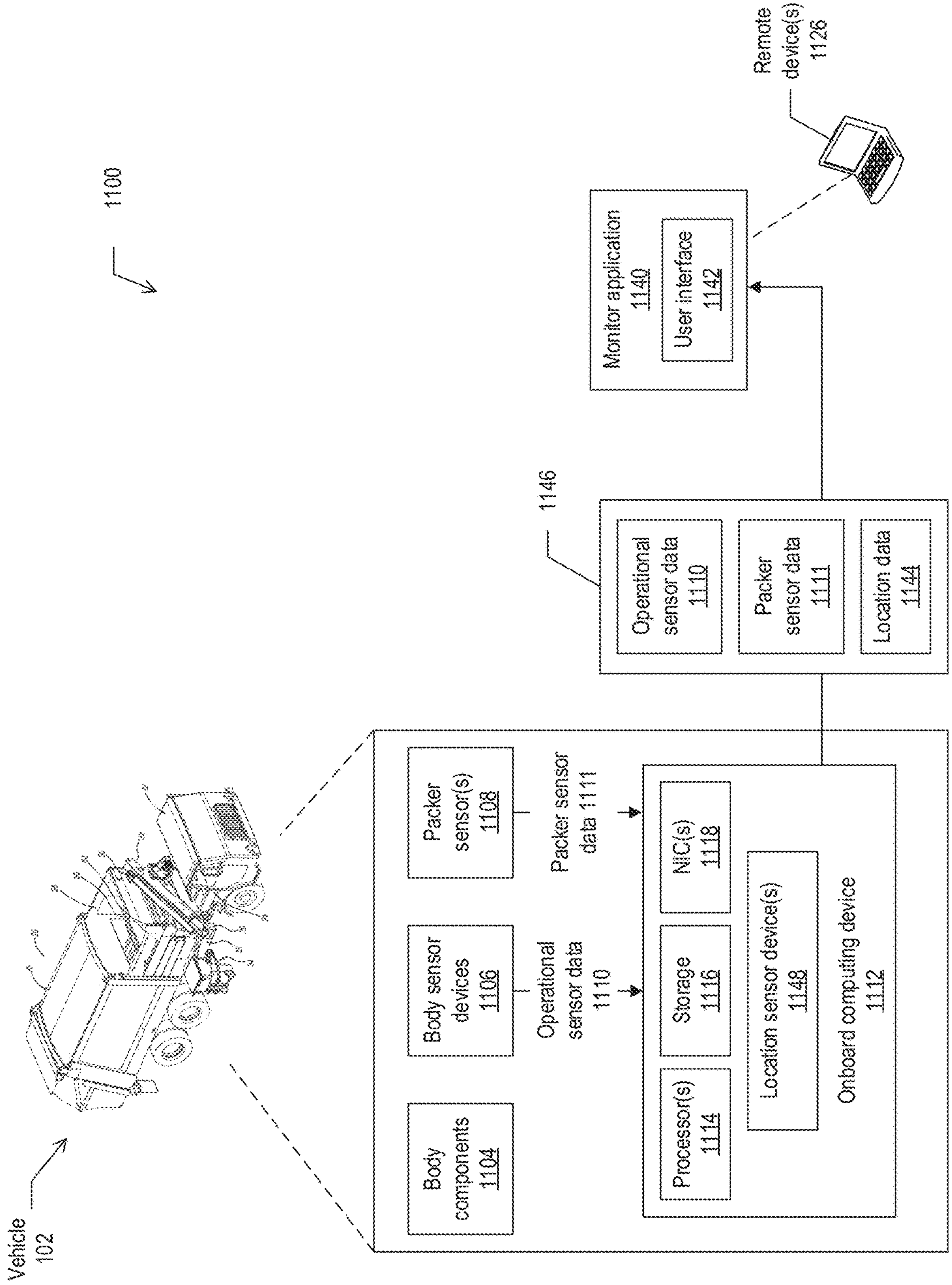
FIG. 23 depicts an example of a control system for a vehicle including a packer system, according to implementations of the present disclosure.

FIG. 23 illustrates a control system for a vehicle including a packer system, according to implementations of the present disclosure. Control system 1100 can include any number of packer sensors 1108 that sense loads, position, angle, or other characteristics of the packer system or its components. The packer sensors may provide data during compaction, ejection, when the system is idle or shut down, or any other mode of operation. In some cases, sensors are used to obtain data about the operation of the drive system, such as operating temperature or pressure. Information from the sensors can be used to control motion of the ejector. For example, speed or acceleration of an ejector may be controlled based on loads encountered during packing, ejecting, or retracting.

Vehicle 102 can also include any number of body sensor devices 1106 that sense body component(s), and generate operational sensor data 1110 describing the operation(s) and/or the operational state of various body components 1104. The body sensor devices 1106 are also referred to as operational sensor devices, or operational sensors. Operational sensors may be arranged in the body components, or in proximity to the body components, to monitor the operations of the body components. The operational sensors may emit signals that include the operational sensor data 1110 describing the body component operations, and the signals may vary appropriately based on the particular body component being monitored. In some implementations, the operational sensor data 1110 is analyzed, by a computing device on the vehicle and/or by remote computing device(s), to identify the presence of a triggering condition based at least partly on the operational state of one or more body components, as described further below.

In some implementations, the operational sensor data and packer sensor data may be communicated from the body sensors and packer sensors, respectively, to an onboard computing device 1112 in the vehicle 102. In some instances, the onboard computing device is an under-dash device (UDU), and may also be referred to as the Gateway. Alternatively, the device 1112 may be placed in some other suitable location in or on the vehicle. The sensor data and/or image data may be communicated from the sensors and/or cameras, to the onboard computing device 1112, over a wired connection (e.g., an internal bus) and/or over a wireless connection. In some implementations, a J1939 bus connects the various sensors and/or cameras with the onboard computing device. In some implementations, the sensors and/or cameras may be incorporated into the various body components. Alternatively, the sensors and/or cameras may be separate from the body components. In some implementations, the sensors and/or cameras digitize the signals that communicate the sensor data and/or image data, before sending the signals to the onboard computing device, if the signals are not already in a digital format.

The onboard computing device 1112 can include one or more processors 1114 that provide computing capacity, data storage 1116 of any suitable size and format, and network interface controller(s) 1118 that facilitate communication of the device 1112 with other device(s) over one or more wired or wireless networks.

In some implementations, the analysis of operational sensor data 1110 and/or packer sensor data 1111 is performed at least partly by the onboard computing device 1112, e.g., by processes that execute on the processor(s) 1114. For example, the onboard computing device 1112 may execute processes that perform an analysis of sensor data 1110 to detect the presence of a triggering condition (for example, blockage in the hopper compartment or storage compartment, or other state of operation or conditions). On detecting the triggering condition, the device 1112 can transmit one or more signals 1146 to a remote computing device, such as remote device(s) 1126. In some implementations, onboard computing device 1112 operates as an edge device.

In the example of FIG. 23, the signal(s) 1146 (possibly including operational sensor data 1110, packer sensor data 1111, location data 1144, and/or other information) are sent to remote device(s) 1126, and image(s) are presented in a user interface 1142 of a monitor application 1140 executing on remote device(s) 1126. Location data 1144 can include global positioning system ("GPS") data and/or sensor-based location data (e.g., proximity sensors or in-cylinder position sensors). In some implementations, the operational sensor data 1110, packer sensor data 1111, location data 1144, and/or other information is analyzed on the device 1112 to identify triggering conditions. A large amount of sensor data and image data can be generated by the sensors and cameras respectively, and received by the onboard computing device 1112. In some implementations, a suitable data compression technique is employed to compress the sensor data, image data, location data, and/or other information before it is communicated in the signal(s), over network(s), to the remote device(s) 1126 for further analysis. In some implementations, the compression is lossless, and no filtering is performed on the data that is generated and communicated to the onboard computing device and then communicated to the remote device(s). Accordingly, such implementations avoid the risk of losing possibly relevant data through filtering.

Sensors can be provided on the vehicle body to evaluate cycles and/or other parameters of various body components. For example, the sensors can measure the hydraulic pressure of various hydraulic components, and/or pneumatic pressure of pneumatic components. The sensors can also detect and/or measure the particular position and/or operational state of body components such as the top door of a refuse vehicle, an intermediate collection device attached to a refuse vehicle, a lift arm, a refuse packing mechanism, a tailgate, and so forth, to detect events such as a lift arm cycle, a pack cycle, a tailgate open or close event, an eject event, tailgate locking event, and/or other body component operations.

In some implementations, the onboard computing device is a multi-purpose hardware platform. The device can include a UDU (Gateway) and/or a window unit (WU) (e.g., a device with camera(s), sensors, and/or any computing device) to record video and/or audio operational activities of the vehicle. The onboard computing device hardware subcomponents can include, but are not limited to, one or more of the following: a CPU, a memory or data storage unit, a CAN interface, a CAN chipset, NIC(s) such as an Ethernet port, USB port, serial port, I2C lines(s), and so forth, I/O ports, a wireless chipset, a GPS chipset, a real-time clock, a micro SD card, an audio-video encoder and decoder chipset, and/or external wiring for CAN and for I/O. The device can also include temperature sensors, battery and ignition voltage sensors, motion sensors, an accelerometer, a gyroscope, an altimeter, a GPS chipset with or without dead reckoning, and/or a digital can interface (DCI). The DCI cam hardware subcomponent can include the following: CPU, memory, can interface, can chipset, Ethernet port, USB port, serial port, I2C lines, I/O ports, a wireless chipset, a GPS chipset, a real-time clock, and external wiring for CAN and/or for I/O. In some implementations, the onboard computing device is a smartphone, tablet computer, and/or other portable computing device that includes components for recording video and/or audio data, processing capacity, transceiver(s) for network communications, and/or sensors for collecting environmental data, telematics data, and so forth.

In some implementations, the onboard computing device 1112 (e.g., UDU) collects operational sensor data 1110 on an ongoing basis and/or periodically (e.g., every second, every 5 seconds, etc.), and the data is analyzed to determine whether a triggering condition is present. In some implementations, the determination of a triggering condition can be further based on the location and/or movement of the vehicle. For example, a triggering condition can be determined based on the vehicle moving at less than a threshold speed (or decelerating to below a threshold speed) prior to the operational sensor data indicating a particular operational state of body components, and/or when the vehicle is within a threshold distance (e.g., within 10-15 feet) of a known location of a container to be handled. One or more images can be retrieved that visualize the refuse after the container is emptied into the hopper or intermediate collection device (e.g., at a time that is determined based on the operational sensor data). Velocity, acceleration (or deceleration), and/or location of the vehicle can be based at least partly on information received from the vehicle's onboard systems, such as a GPS receiver and/or telematics sensor(s) describing the current speed, orientation, and/or location of the vehicle at one or more times.

In some implementations, the data to be uploaded to the remote device(s) 1126 can be packaged, in the signal(s) 1146, into bundles of (e.g., telemetry) data every 5-10 minutes. This bundle of data can be compressed and/or encrypted, and transmitted to the remote device(s) over a suitable network, such as a wireless cell network. In some implementations, the uploaded data includes the relevant data for one or more particular container handling events. For example, the operational sensor data and/or location data can be analyzed on the device 1112 to determine the presence of a triggering condition, and the particular image(s) (and/or video data) for the appropriate time period based on the triggering condition can be uploaded for analysis along with the corresponding time period of telemetry data, operational sensor data, and/or location data. In some instances, the data can be uploaded in real time with respect to the handling of the container, or the data can be uploaded in batches periodically. Data upload may be delayed until a suitable network connection is available between the onboard computing device 1112 and the remote device(s) 1126.

As used herein, a real time process or operation describes a process or operation that is performed in response to detecting a triggering condition (e.g., event), in which the real time process is performed without any unnecessary delay following the triggering condition, apart from the delay that is incurred due to the limitations (e.g., speed, bandwidth) of any networks being used, transfer of data between system components, memory access speed, processing speed, and/or computing resources. A real time process or operation may be performed within a short period of time following the detection of the triggering condition, and/or may be performed at least partly concurrently with the triggering condition. A triggering condition may be the receipt of a communication, the detection of a particular system state, and/or other types of events. In some instances, a real time process is performed within a same execution path, such as within a same process or thread, as the triggering condition. In some instances, a real time process is performed by a different process or thread that is created or requested by a process that detects the triggering condition. A real time process may also be described as synchronous with respect to the triggering condition.

Figure 24:
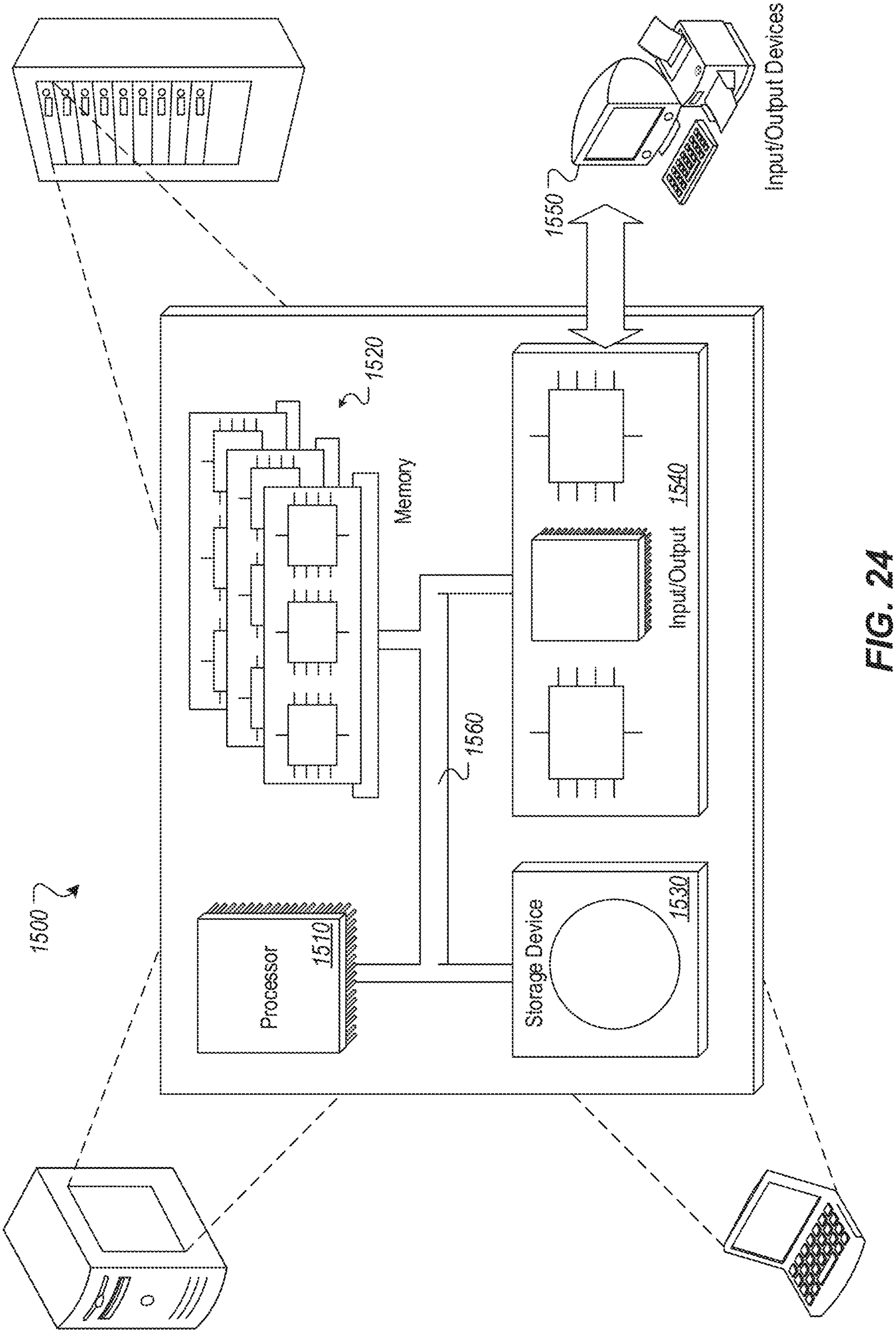
FIG. 24 depicts an example computing system, according to implementations of the present disclosure.

FIG. 24 depicts an example computing system, according to implementations of the present disclosure. The system 1500 may be used for any of the operations described with respect to the various implementations discussed herein. For example, the system 1500 may be included, at least in part, in one or more of the onboard computing device 1112, the analysis computing device(s) 1120, the output device(s) 1126, and/or other computing device(s) or system(s)

described herein. The system 1500 may include one or more processors 1510, a memory 1520, one or more storage devices 1530, and one or more input/output (I/O) devices 1550 controllable via one or more I/O interfaces 1540. The various components 1510, 1520, 1530, 1540, or 1550 may be interconnected via at least one system bus 1560, which may enable the transfer of data between the various modules and components of the system 1500.

The processor(s) 1510 may be configured to process instructions for execution within the system 1500. The processor(s) 1510 may include single-threaded processor(s), multi-threaded processor(s), or both. The processor(s) 1510 may be configured to process instructions stored in the memory 1520 or on the storage device(s) 1530. For example, the processor(s) 1510 may execute instructions for the various software module(s) described herein. The processor(s) 1510 may include hardware-based processor(s) each including one or more cores. The processor(s) 1510 may include general purpose processor(s), special purpose processor(s), or both.

The memory 1520 may store information within the system 1500. In some implementations, the memory 1520 includes one or more computer-readable media. The memory 1520 may include any number of volatile memory units, any number of non-volatile memory units, or both volatile and non-volatile memory units. The memory 1520 may include read-only memory, random access memory, or both. In some examples, the memory 1520 may be employed as active or physical memory by one or more executing software modules.

The storage device(s) 1530 may be configured to provide (e.g., persistent) mass storage for the system 1500. In some implementations, the storage device(s) 1530 may include one or more computer-readable media. For example, the storage device(s) 1530 may include a floppy disk device, a hard disk device, an optical disk device, or a tape device. The storage device(s) 1530 may include read-only memory, random access memory, or both. The storage device(s) 1530 may include one or more of an internal hard drive, an external hard drive, or a removable drive.

One or both of the memory 1520 or the storage device(s) 1530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 1500. In some implementations, the CRSM may include a data store that provides storage of computer-readable instructions or other information in a non-transitory format. The CRSM may be incorporated into the system 1500 or may be external with respect to the system 1500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 1510 and the memory 1520 may be supplemented by, or incorporated into, one or more application-specific integrated circuits (ASICs). The system 1500 may include one or more I/O devices 1550.

The system 1500 may include one or more I/O interfaces 1540 to enable components or modules of the system 1500 to control, interface with, or otherwise communicate with the I/O device(s) 1550. The I/O interface(s) 1540 may enable information to be transferred in or out of the system 1500, or between components of the system 1500, through serial communication, parallel communication, or other types of communication. For example, the I/O interface(s) 1540 may comply with a version of the RS-232 standard for serial ports, or with a version of the IEEE 1284 standard for parallel ports. As another example, the I/O interface(s) 1540 may be configured to provide a connection over Universal Serial Bus (USB) or Ethernet. In some examples, the I/O interface(s) 1540 may be configured to provide a serial connection that is compliant with a version of the IEEE 1394 standard.

Computing devices of the system 1500 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term “computing system” encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

As used herein, a "packer" includes any device, mechanism, or system that packs or compacts material in a compartment or ejects material from a compartment.

As used herein, an "ejector" includes any component or combination of components that can be used to push material to compact the material or eject the material from a compartment or vessel. As one example, an ejector may be a metal plate that collects and moves refuse as the ejector is moved within a storage compartment.

As used herein, a "driver" includes any device, mechanism, or system that imparts force to mechanically drive one or more components. Examples of a driver include a hydraulic motor, an electric motor, or an engine. A driver may also include gearboxes, belts, chain drives, or any other power transmission devices.

As used herein, a "storage compartment" includes a compartment in which refuse can be stored. In some cases, refuse may remain in the storage compartment while the vehicle travels to a disposal facility. In other cases, refuse may be immediately ejected from the storage compartment as the packer system pushes the refuse through the vehicle.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claim(s).

The invention claimed is:

1. A refuse collection vehicle, comprising:
- a body comprising a storage compartment and a hopper;
- a wall at least partially between the hopper and the storage compartment, wherein the wall defines an opening configured to allow refuse to pass from the hopper to the storage compartment, wherein the wall comprises:
  - a first side facing toward the storage compartment; and
  - a second side facing toward the hopper, the second side opposite the first side;
- a packer system coupled to the body, the packer system comprising:
  - an auger screw operable to rotate to advance refuse from the hopper to the storage compartment through the opening in the wall; and
  - a driver coupled to the auger screw and operable to rotate the auger screw such that refuse is packed into the storage compartment;
- a door rotatable about an axis orthogonal to the first side of the wall to cover at least a portion of the opening in the wall to inhibit refuse from passing through the opening, wherein the first side of the wall is located between the door and the second side of the wall, and wherein the door comprises:
  - a plate comprising:
    - a first surface facing the wall; and
    - a second surface facing a rear of the refuse collection vehicle; and
  - one or more sweeping members configured to sweep, via rotation of the door about the axis, refuse from in front of the opening in the wall, wherein the one or more sweeping members comprise at least one rib extending from the second surface of the plate toward the rear of the refuse collection vehicle; and
- an actuator system configured to move the wall across at least a portion of a floor of the storage compartment while the door at least partially covers the opening in the wall.

2. The refuse collection vehicle of claim 1, wherein the door is configured to rotate about a hinge point offset from the opening in the wall.

3. The refuse collection vehicle of claim 1, wherein the door comprises two or more door panels, wherein at least two of the two or more door panels are separately movable from one another.

4. The refuse collection vehicle of claim 1, wherein the door comprises two or more panels, and wherein at least two of the two or more panels are rotatable away from one another to at least partially uncover the opening in the wall.

5. The refuse collection vehicle of claim 1, wherein the driver of the packer system comprises a hydraulic motor.

6. The refuse collection vehicle of claim 1, wherein the driver of the packer system comprises an electric motor.

7. The refuse collection vehicle of claim 1, further comprising one or more linear actuators configured to rotate the door about a hinge point.

8. The refuse collection vehicle of claim 1, further comprising an electric motor to rotate the door.

9. The refuse collection vehicle of claim 1, further comprising a control system configured to control rotation of the door.

10. The refuse collection vehicle of claim 1, further comprising an automatic side loader configured to load refuse into the hopper.

11. The refuse collection vehicle of claim 1, further comprising a door actuator configured to rotate the door, wherein the door actuator is configured to be operated in a sweeping mode to clear refuse from in front of the opening in response to determining, based on data received from one or more sensors, that the door is unable to move between a fully closed position and a fully open position due to blockage by refuse in the path of the door.

12. A refuse collection vehicle, comprising:

a body comprising a storage compartment and a hopper;

a wall at least partially between the hopper and the storage compartment, wherein the wall defines an opening configured to allow refuse to pass from the hopper to the storage compartment, and wherein the wall comprises:

a first side facing toward the storage compartment; and a second side facing toward the hopper, the second side opposite the first side;

a door rotatable about an axis orthogonal to the first side of the wall to selectively cover at least a portion of the opening in the wall to inhibit refuse from passing through the opening, wherein the first side of the wall is located between the door and the second side of the wall, and wherein the door comprises:

a plate comprising:

a first surface facing the wall; and a second surface facing a rear of the refuse collection vehicle; and one or more sweeping members configured to sweep, via rotation of the door about the axis, refuse from in front of the opening in the wall, wherein the one or more sweeping members comprise at least one rib extending from the second surface of the plate toward the rear of the refuse collection vehicle; and a packer system coupled to the body, the packer system comprising:

one or more auger screws operable to rotate to advance refuse from the hopper to the storage compartment through the opening in the wall;

an auger screw driver coupled to at least one auger screw of the one or more auger screws and operable to rotate the at least one auger screw such that refuse is packed into the storage compartment;

an ejector panel; and a packing actuator configured to push the ejector panel across at least a portion of a floor of the storage compartment while the door is at least partially closed on the opening in the wall.

13. The refuse collection vehicle of claim 12, wherein the packing actuator comprises one or more linear actuators configured to move the ejector panel.

14. The refuse collection vehicle of claim 12, wherein the one or more auger screws are configured to remain stationary in the body of the vehicle as the packing actuator advances the ejector panel across at least a portion of a floor of the storage compartment.

15. The refuse collection vehicle of claim 12, wherein the packing actuator is configured to advance at least one of the one or more auger screws across at least a portion of a floor of the storage compartment.

16. The refuse collection vehicle of claim 12, wherein the ejector panel is included in the wall.

17. The refuse collection vehicle of claim 12, wherein the ejector panel is coupled to the wall.

18. The refuse collection vehicle of claim 12, wherein the auger screw driver comprises a hydraulic motor.

19. The refuse collection vehicle of claim 12, wherein the auger screw driver comprises an electric motor.

20. The refuse collection vehicle of claim 12, wherein the one or more auger screws comprise two auger screws in a side-by-side arrangement, wherein each of the auger screws is configurable to rotate to advance refuse from the hopper to the storage compartment through the opening in the wall.

21. The refuse collection vehicle of claim 12, further comprising one or more tracks coupled to the body, wherein the ejector panel is configured to engage on the one or more tracks.

22. The refuse collection vehicle of claim 12, wherein:

the packing actuator is configured to push the ejector panel to advance the ejector panel from a first position toward a second position; and the packing actuator is further configured to at least partially retract the ejector panel toward the first position.

23. The refuse collection vehicle of claim 12, wherein the door is configured to rotate about a hinge point offset from the opening in the wall.

24. The refuse collection vehicle of claim 12, further comprising a door actuator configured to rotate the door, wherein the door actuator is configured to be operated in a sweeping mode to clear refuse from in front of the opening in response to determining, based on data received from one or more sensors, that the door is unable to move between a fully closed and a fully open position due to blockage by refuse in the path of the door.

* * * * *